US012140112B2

(12) United States Patent
Ganser

(10) Patent No.: US 12,140,112 B2
(45) Date of Patent: Nov. 12, 2024

(54) FUEL INJECTION VALVE FOR INTERNAL COMBUSTION ENGINES

(71) Applicant: Ganser-Hydromag AG, Oberägeri (CH)

(72) Inventor: Marco Ganser, Oberägeri (CH)

(73) Assignee: GANSER-HYDROMAG AG, Oberägeri (CH)

( * ) Notice: Subject to any disclaimer, the term of this patent is extended or adjusted under 35 U.S.C. 154(b) by 0 days.

(21) Appl. No.: 17/793,924

(22) PCT Filed: Feb. 16, 2021

(86) PCT No.: PCT/EP2021/053797
§ 371 (c)(1),
(2) Date: Jul. 19, 2022

(87) PCT Pub. No.: WO2021/165275
PCT Pub. Date: Aug. 26, 2021

(65) Prior Publication Data
US 2023/0045640 A1 Feb. 9, 2023

(30) Foreign Application Priority Data
Feb. 17, 2020 (CH) ........................................ 173/20

(51) Int. Cl.
*F02M 47/00* (2006.01)
*F02M 47/02* (2006.01)
*F02M 63/00* (2006.01)

(52) U.S. Cl.
CPC ...... *F02M 47/025* (2013.01); *F02M 63/0014* (2013.01); *F02M 63/0028* (2013.01)

(58) Field of Classification Search
CPC ............... F02M 63/04; F02M 63/0033; F02M 63/0035; F02M 63/0036; F02M 63/004;
(Continued)

(56) References Cited

U.S. PATENT DOCUMENTS

2008/0257989 A1 * 10/2008 Ricco .................. F02M 47/027 123/472
2009/0032620 A1 * 2/2009 Ricco .................. F02M 47/027 123/472
(Continued)

FOREIGN PATENT DOCUMENTS

CN 102828872 A * 12/2012 .......... F02M 47/025
EP 2476893 A1 7/2012
(Continued)

OTHER PUBLICATIONS

Machine-generated English language translation of Description of EP 1991773 B1 (May 15, 2013).
(Continued)

*Primary Examiner* — George C Jin
*Assistant Examiner* — Teuta B Holbrook
(74) *Attorney, Agent, or Firm* — Hershkovitz & Associates, PLLC; Abe Hershkovitz

(57) ABSTRACT

The fuel injection valve has a hydraulic control device for controlling the axial movement of the injection valve member. The stem of the intermediate valve member of mushroom-shaped configuration of the intermediate valve is guided in the guide recess of the intermediate part. In the open position, the intermediate valve member opens up a second connection between a high-pressure fuel inlet and a valve chamber and, in the closed position, the intermediate valve member shuts off the second connection between the high-pressure fuel inlet and the valve chamber. In the closed position of the intermediate valve member, the head of the intermediate valve member lies with a side facing toward the intermediate part against the intermediate valve seat via a first sealing surface, which runs around the stem or the guide recess at a first radial spacing so as to form a first annular
(Continued)

sealing surface which is continuous in the circumferential direction.

35 Claims, 8 Drawing Sheets

(58) Field of Classification Search
CPC ........... F02M 63/0042; F02M 63/0014; F02M 63/0012; F02M 47/00; F02M 47/043; F02M 47/046; F02M 2547/006; F02M 63/008; F02M 21/0257; F02M 21/026
USPC ......... 239/553.1, 533.3, 533.4, 533.5, 533.9; 123/445, 472
See application file for complete search history.

(56) References Cited

U.S. PATENT DOCUMENTS

| | | | | |
|---|---|---|---|---|
| 2009/0065614 | A1* | 3/2009 | Ganser | F02M 63/0029 239/584 |
| 2010/0301143 | A1 | 12/2010 | Adachi et al. | |
| 2017/0298888 | A1* | 10/2017 | Ganser | F02M 63/0005 |
| 2020/0263644 | A1 | 8/2020 | Benson et al. | |

FOREIGN PATENT DOCUMENTS

| | | | | | |
|---|---|---|---|---|---|
| EP | 1991773 | B1 | | 5/2013 | |
| JP | 2011169242 | A | | 9/2011 | |
| JP | 2011190746 | A | * | 9/2011 | F02M 47/027 |
| WO | WO 2007/009279 | A1 | | 1/2007 | |
| WO | WO 2009/033304 | A1 | | 3/2009 | |
| WO | WO 2013/117311 | A1 | | 8/2013 | |
| WO | WO 2014/131497 | A1 | | 9/2014 | |
| WO | WO 2016/041739 | A1 | | 3/2016 | |
| WO | WO 2019/078881 | A1 | | 4/2019 | |
| WO | WO 2020/260285 | A1 | | 12/2020 | |

OTHER PUBLICATIONS

English language Abstract of JP 2011169242 A (Sep. 1, 2011).
English language Abstract of JP 2011190746 A (Sep. 29, 2011).
English language translation of the International Search Report in International Application No. PCT/EP2021/053797, mailed on Jun. 23, 2021.
Written Opinion of the International Searching Authority in International Application No. PCT/EP2021/053797, mailed on Jun. 23, 2021.

* cited by examiner

FUEL INJECTION VALVE FOR INTERNAL COMBUSTION ENGINES

FIELD OF THE INVENTION

The present invention relates to a fuel injection valve for intermittently injecting fuel into the combustion chamber of an internal combustion engine.

BACKGROUND TO THE INVENTION

A fuel injection valve for intermittently injecting fuel into the combustion chamber of an internal combustion engine is described in document WO 2016/041739 A1, for example. Said fuel injection valve has a hydraulic control device for controlling the axial movement of an injection valve member by varying the pressure in a control chamber. An intermediate valve of the hydraulic control device has an intermediate valve member configured in the shape of a mushroom, the shaft thereof being guided in a tight sliding fit in a guiding recess which runs through an intermediate part. In the shut position of the intermediate valve member, a head of the intermediate valve member—by way of the sealing face thereof that runs at a radial spacing about the shaft—bears on an annular intermediate valve seat configured on the intermediate part. An annular chamber which has an inner annular chamber that runs about the shaft and is delimited by the intermediate part, shaft and head by way of a high-pressure fuel supply port that runs through the intermediate part, is permanently connected to a high-pressure fuel inlet configured on a housing of the fuel injection valve. The intermediate valve, by way of the shaft guided in a tight sliding fit on the intermediate part, permanently separates the control chamber from a valve chamber, with the exception of a throttle passage of a precise size which is configured on the intermediate valve member and permanently connects the control chamber to the valve chamber. In the shut position of the intermediate valve member, the intermediate valve separates the high-pressure fuel supply port and the annular chamber from the control chamber and, when the intermediate valve member is moved out of the shut position, a connection between the annular chamber as well as the high-pressure fuel supply port and the control chamber is released by the intermediate valve. The valve chamber, by means of an electrically activated actuator assembly, is able to be connected to low-pressure fuel return and to be separated from the latter. In order for an injection procedure to be triggered, the valve chamber by means of the actuator assembly is connected to the low-pressure fuel return, whereupon fuel from the control chamber flows into the valve chamber by way of the throttle passage in the intermediate valve member, the injection valve member being lifted from the injection valve seat disposed in the housing as a consequence of the pressure drop associated therewith in the control chamber.

A further fuel injection valve is described in document EP 1 991 773 B1. While a control chamber and a valve chamber are permanently connected to one another by way of a precise throttle passage, these two chambers are moreover permanently separated from one another by an intermediate valve. The throttle passage is disposed so as to be directly adjacent to the control chamber. A passage, which in comparison to the cross section of the throttle passage has a large cross section and leads into the control chamber and is connected to the high-pressure chamber of the injection valve, is controlled by the intermediate valve. Because the cross section of the outlet from the valve chamber that is controlled by an electric actuator assembly can also be substantially larger than the cross section of the throttle passage, the opening movement of the injection valve member is a function of substantially solely the cross section of the throttle passage. When the outlet from the valve chamber is closed by means of the actuator assembly, the intermediate valve opens rapidly and releases the large-diameter passage connected to the high-pressure chamber, this causing a rapid termination of the injection procedure.

SUMMARY OF THE INVENTION

In the case of fuel injection valves it is typically desirable for the construction to be simplified, wherein a capability of reliably controlling the opening movement of the injection valve member as well as a rapid closing procedure of the injection valve member are to be made possible in association with a reduced complexity in terms of construction.

It is, therefore, an object of the present invention to provide a fuel injection valve which at least partially improves the prior art.

This object is achieved by a fuel injection valve having the features of the independent claims. Advantageous design embodiments of the invention are set forth in the dependent claims and in the present description and the figures.

The invention relates to a fuel injection valve for intermittently injecting fuel into the combustion chamber of an internal combustion engine, having a housing which defines a longitudinal axis and has a high-pressure fuel inlet and an injection valve seat. A high-pressure chamber which runs from the high-pressure fuel inlet to the injection valve seat is disposed in the housing. Furthermore disposed in the housing is an injection valve member which is adjustable in the direction of the longitudinal axis and interacts with the injection valve seat.

The fuel injection valve furthermore comprises a compression spring which impinges the injection valve member with a closing force directed in the direction towards the injection valve seat and is preferably supported on the injection valve member, on the one hand, and is supported so as to be stationary relative to the housing, on the other hand; a guide part in which a control piston of the injection valve member is guided in a sliding fit; an intermediate part which, conjointly with the guide part and the control piston, delimits a control chamber; and a hydraulic control device for controlling the axial movement of the injection valve member by modifying the pressure in the control chamber.

The hydraulic control device comprises an intermediate valve having an intermediate valve member which is configured in the shape of a mushroom and has a shaft, guided in a guiding recess of the intermediate part, and a head, and an intermediate valve seat which is configured on a side of the intermediate part that faces the head and which interacts with the head.

The intermediate valve member in an open position releases a connection between a high-pressure fuel supply port, connected to the high-pressure chamber, and the control chamber. In a shut position, the intermediate valve member interrupts the connection between the high-pressure fuel supply port and the control chamber and, with the exception of a throttle passage, separates the control chamber from a valve chamber.

The fuel injection valve furthermore comprises an electrically activated actuator assembly for connecting the valve chamber to a low-pressure fuel return and for separating the valve chamber from the low-pressure fuel return.

The head in the shut position of the intermediate valve member, by way of a side that faces the intermediate part, across a first sealing face that runs at a first radial spacing about the shaft or the guiding recess, while forming a first annular sealing face inherently closed in the encircling direction, and across a second sealing face that runs at a second radial spacing about the shaft or the guiding recess, while forming a second annular sealing face inherently closed in the encircling direction, bears on the intermediate valve seat, wherein the first radial spacing is larger than the second radial spacing.

The guide part and the intermediate part can be configured as discrete components. However, it is also possible for the guide part and the intermediate part to be integrally configured as a single-piece component.

The throttle passage is preferably configured on the intermediate valve member, particular preferably on the head of the intermediate valve member. However, the throttle passage can also be configured on the intermediate part. In further variants, the throttle passage can be configured between the intermediate valve member and another component, such as by a gap between the intermediate part or the guide part, for example. The throttle passage configured on the intermediate valve member, on the side that faces away from the control chamber, can open into a blind bore which is recessed on the intermediate valve member and is associated with the valve chamber. The throttle passage in the intermediate valve member is preferably configured so as to be adjacent to the control chamber. The throttle passage and the blind bore are preferably configured so as to be centric in relation to the longitudinal axis. As a result, the throttle passage can be configured so as to have the desired length, on the one hand, and the blind bore can form part of the valve chamber, on the other hand.

The first sealing face and the second sealing face are preferably toroidal faces which are disposed so as to be mutually concentric. Depending on the design embodiment, the first sealing face can be configured on the head, i.e. on the side of the head that faces the intermediate part, or on the intermediate part, i.e. on the side of the intermediate part that faces the head. Depending on the design embodiment, the second sealing face in turn can be configured on the head, i.e. on the side of the head that faces the intermediate part, or on the intermediate part, i.e. on the side of the intermediate part that faces the head.

As a result of the head in the shut position of the intermediate valve member bearing in a sealing manner on the intermediate valve seat, while forming a first and a second annular sealing face, the fluidic interruption of the connection between the high-pressure fuel supply port and the control chamber in the shut position of the intermediate valve member can be improved. Moreover, the separation of the control chamber from the valve chamber which, with the exception of the throttle passage, exists in the shut position of the intermediate valve member can be improved as a result, this enabling a more precise control of the axial movement of the injection valve member by way of adapting the dimensions of the throttle passage, and thus a more precise control of the injection procedure. As a result of the specific design embodiment of the sealing faces, for example by way of the geometry or dimensions of the latter, the sealing properties of the intermediate valve can therefore be adapted. The sealing properties of the intermediate valve here, while restricting or minimizing, respectively, adhesive forces between the intermediate part and the intermediate valve member, can be improved because the annular sealing faces are small in comparison to the mutually facing faces of the head and of the intermediate part.

Furthermore, in the shut position of the intermediate valve member, an intermediate space, preferably an annular gap space, between the annular sealing faces, the intermediate part and the head is preferably formed. In specific design embodiments, the annular sealing faces seal the intermediate space in relation to the valve chamber as well as in relation to the control chamber. In specific further design embodiments, the annular sealing faces seal the intermediate space in relation to the high-pressure fuel supply port. As will be described further below, depending on the design embodiment, a passage or a plurality of passages can advantageously be configured in the intermediate part or in the intermediate valve member as a result, said passage or passages in the shut position of the intermediate valve member opening into this intermediate space and not generating any, or a negligible, disturbing influence on the control of the injection procedure.

In specific design embodiments the annular gap space, when measured in the direction of the longitudinal axis, has a gap width of less than 1 mm, or less than 0.5 mm, or less than 0.1 mm, or less than 0.05 mm.

In one design embodiment, the high-pressure fuel supply port in the intermediate part runs in such a manner that the high-pressure fuel supply port in the shut position of the intermediate valve member opens into an annular gap space which in the shut position of the intermediate valve member is configured between the intermediate part and the head and is radially delimited by the first and the second annular sealing face.

As a result of the high-pressure fuel supply port in the shut position of the intermediate valve member opening into the annular gap space that is delimited by the intermediate part, the head and the first and the second annular sealing face, the valve chamber as well as the control chamber in the shut position of the intermediate valve member can be fluidically separated from the high-pressure fuel supply port, or the high-pressure chamber, respectively, by means of the sealing annular sealing faces. This offers the advantage that in the shut position of the intermediate valve member the ingress of fuel from the high-pressure chamber into the valve chamber or the control chamber by way of the high-pressure fuel supply port can be minimized or avoided, the precision of control of the injection procedure being improved as a result.

In particular, an increased clearance can be provided between the shaft of the intermediate valve member and the guiding recess of the intermediate part, because the first and the second annular sealing face assume the function of fluidically sealing the high-pressure fuel supply port in relation to the valve chamber and the control chamber, and therefore no additional fluidic sealing by way of the guidance of the shaft in the guiding recess of the intermediate part is required. A tight sliding fit of the shaft in the guiding recess for reducing leakages, as described in WO 2016/041739 A1, for example, is therefore no longer mandatory. An increased range of the potential clearance between the shaft and the guiding recess advantageously simplifies the production of the components, i.e. of the intermediate valve member or of the shaft, respectively, and of the intermediate part or of the guiding recess, respectively. Besides the greater tolerance in the manufacturing of the shaft and of the intermediate part, the height of the shaft in the axial direction, i.e. along the longitudinal axis, can moreover be reduced because the guide of the shaft in the guiding recess no longer has to additionally assume a function in terms of fluidic sealing. This advantageously permits a more compact construction mode. Furthermore, as a result of the increased clearance, the valve chamber can be more rapidly flooded by fuel flowing between the shaft and the guiding recess during an opening movement of the intermediate valve member for terminating an injection procedure, as a result of which the termination of the injection procedure can be accelerated.

Radial compressive forces in the annular gap space, which can be unfavorable in terms of the sealing effect of the annular sealing faces, can be reduced as a result of the annular gap space having smaller dimensions in the axial direction, i.e. along the longitudinal axis, for example in comparison to the length of the shaft.

As described above, the annular gap space, when measured in the direction of the longitudinal axis, can have a gap width of less than 1 mm, or less than 0.5 mm, or less than 0.1 mm, or less than 0.05 mm.

However, instead of the annular gap space as described above, it is also possible for an intermediate space having larger dimensions in the axial direction to be provided.

The high-pressure fuel supply port, in terms of the longitudinal axis, can comprise a horizontal bore and a vertical bore, wherein the vertical bore in the shut position of the intermediate valve member opens into the annular gap space.

The shaft can in particular be guided in a sliding fit in the guiding recess of the intermediate part in such a manner that a clearance of at least 10 μm, preferably between 20 μm and 50 μm, is present in the radial direction between the shaft and the guiding recess.

In one design embodiment, the intermediate valve member has a supply port which by way of a first end opens into the valve chamber and by way of a second end opens toward an external side of the intermediate valve member in such a manner that the second end in the shut position of the intermediate valve member is disposed at a radially smaller spacing from the shaft than the second annular sealing face.

As a result of the supply port, the opening procedure of the intermediate valve can be facilitated because the valve chamber by way of the supply port can be more rapidly flooded with fuel from the high-pressure chamber when the valve chamber for terminating an injection procedure is separated from the low-pressure fuel return by the actuator assembly. In this context, the external side of the intermediate valve member is understood to mean a face of the intermediate member that faces the guiding recess of the intermediate part. A blind bore which preferably protrudes into the head and configures part of the valve chamber is preferably configured in the shaft of the intermediate valve member, said blind bore being configured from an end side that faces away from the head. In such a design embodiment, the supply port by way of the first end can open into the blind bore.

An inner annular chamber which is adjacent to the shaft and the second annular sealing face is preferably configured between the intermediate part and the head in the shut position of the intermediate valve member, wherein the supply port in the shut position of the intermediate valve member connects the inner annular chamber to the valve chamber.

The supply port by way of the second end can open toward an external side of the shaft or of the head. In one variant, the second end of the supply port is disposed on a line on which the shaft adjoins the head. In terms of the longitudinal axis, the supply port can be configured as an inclined or horizontal bore.

In one design embodiment, the supply port has a larger diameter than the smallest diameter of the low-pressure fuel return. As a result of the large size of the diameter of the supply port, rapid flooding of the valve chamber can be achieved, this having a positive effect on the opening procedure of the intermediate valve. The large dimensions of the supply port can in particular be enabled without generating additional leakages, because the supply port in the shut position of the intermediate valve member, by virtue of the disposal of the second end, can be fluidically separated from the high-pressure chamber.

In one design embodiment, the shaft has at least one encircling annular protrusion, the shaft being guided in the guiding recess by way of said at least one encircling annular protrusion.

As a result of the annular protrusion, a throttle pathway encircling the shaft can be configured in the axial direction between the shaft and the guiding recess. The throttle pathway configured by the annular protrusion offers the advantage that a turbulent flow instead of a laminar flow can be achieved for the fluid flowing in the longitudinal direction through the intermediate space between the shaft and the guiding recess. In particular, the range of the permissible radial clearance between the shaft and the guiding recess can be further enlarged.

In one design embodiment, the shaft has two annular protrusions that are mutually spaced apart in the longitudinal direction of the shaft.

As a result of the two encircling annular protrusions that are mutually spaced apart in the longitudinal direction of the shaft, two throttle pathways that encircle the shaft and are disposed in series along the longitudinal axis can be configured in the longitudinal direction. As a result, the formation of turbulences and the turbulent flow of the fluid flowing through the intermediate space between the shaft and the guiding recess can be further promoted.

In design embodiments having two annular protrusions which are mutually spaced apart in the longitudinal direction of the shaft, the clearance in the radial direction between the shaft and the guiding recess can moreover be further increased by the effect as throttle pathways disposed in series.

In particular, the shaft here can be guided in the guiding recess of the intermediate part in such a manner that a clearance of at least 50 μm, preferably between 70 μm and 100 μm, is present in the radial direction between the shaft and the guiding recess.

In one design embodiment, the intermediate valve member has a valve chamber passage which is connected to the valve chamber and in the intermediate valve member runs in such a manner that the valve chamber passage in the shut position of the intermediate valve member opens into an annular gap space which in the shut position of the intermediate valve member is configured between the intermediate part and the head and is radially delimited by the first and the second annular sealing face.

As a result of this arrangement, the valve chamber passage in the shut position of the intermediate valve member can advantageously be sealed in relation to the control chamber and the high-pressure fuel supply port. This advantageously permits the diameter of the valve chamber passage to be sized large in comparison to the diameter of the throttle passage, for example, without facilitating leakages from the control chamber or the high-pressure fuel supply port into the valve chamber passage, or the valve chamber, respectively, in the shut position of the intermediate valve member as a result. Large dimensions of the valve chamber passage offer the advantage that the valve chamber can be rapidly flooded by the valve chamber passage when the intermediate valve member moves out of the shut position, this enabling an injection procedure to be rapidly terminated.

In one design embodiment, the fuel injection valve has an annular chamber which in the shut position of the intermediate valve member is delimited by the intermediate part, the shaft and the head, and into which the high-pressure fuel supply port opens.

The annular chamber preferably has an internal annular chamber which runs about the shaft and in the radial direction is delimited by the shaft and the intermediate part and which is preferably recessed on the shaft per se, wherein the high-pressure fuel inlet preferably opens into the internal annular chamber.

The annular chamber preferably has an annular gap space which adjoins the internal annular chamber and in the shut position of the intermediate valve member is formed by an encircling gap between the intermediate part and the head of the intermediate valve member.

In the shut position of the intermediate valve member, the annular gap space can have an at least approximately constant gap width. The gap width here is preferably at least five times smaller than the internal annular chamber, measured in each case in the direction of the longitudinal axis.

The adhesive forces can be further reduced by using such an embodiment of the annular chamber.

The internal annular chamber on the shaft of the intermediate valve member is preferably formed by an encircling annular groove which is open in the radially outward direction and which, when viewed in the direction of the longitudinal axis, preferably has a dimension of such a manner that the throat of the high-pressure fuel supply port always lies at least approximately completely in the region of the annular groove. The annular groove furthermore preferably adjoins the head directly. This advantageously enables a simple configuration of the intermediate part.

The entire throat of the high-pressure fuel supply port preferably lies in the region of the internal annular chamber. As a result, oblique bores on the intermediate part that otherwise could potentially be required can be avoided.

The annular groove preferably has a trapezoidal cross section, wherein the obliquely running side faces away from the head. When the intermediate valve member is open, the fuel flowing through the high-pressure fuel supply port by way of this side can be deflected in the direction toward the head with minor losses.

In the design embodiments in which the intermediate valve member has a valve chamber passage that is connected to the valve chamber and in the shut position of the intermediate valve member opens into the annular gap space, and the high-pressure fuel supply port opens into the annular chamber delimited by the intermediate part, the shaft and the head, the shaft is preferably guided in a tight sliding fit in the guiding recess of the intermediate part, so that any leakage from the high-pressure fuel supply port into the valve chamber by way of the guide of the shaft can be prevented or minimized.

In one design embodiment, a secondary passage which connects the high-pressure fuel supply port, or the high-pressure chamber, respectively, to the valve chamber is configured on the intermediate valve member, preferably on the shaft. Alternatively or additionally, a secondary passage can be configured on the intermediate part.

The secondary passage preferably opens into the valve chamber, preferably into the blind bore of the shaft, by way of a rectilinear throttle bore that runs in the radial direction.

The secondary passage is preferably connected to the high-pressure chamber via the annular chamber which in the shut position of the intermediate valve member is delimited by the intermediate part, the shaft and the head.

In one design embodiment, the secondary passage can run from the annular groove, preferably from the radially inner base thereof, and preferably in the radial direction in terms of the longitudinal axis, into the valve chamber. Alternatively, the shaft of the intermediate valve member can have a preferably groove-shaped pocket recess which proceeds from the annular groove and from which the secondary passage, preferably likewise in the radial direction in terms of the longitudinal axis, runs into the valve chamber. In the embodiment having a pocket recess, preferably two pocket recesses which are diametrically opposite one another are configured on the shaft so as to obtain symmetrical pressure conditions.

In one design embodiment, the valve chamber passage in the head has a bore which is parallel to the longitudinal axis or inclined in relation to the longitudinal axis and in the shut position of the intermediate valve member opens into the annular gap space.

Moreover, the valve chamber passage in the head preferably has a horizontal bore which connects the bore that is parallel to the longitudinal axis or inclined in relation to the longitudinal axis to the blind bore.

The intermediate valve member can also have two or more valve chamber passages which each open into the annular gap space. Accordingly, a plurality of parallel or inclined bores associated with the respective valve chamber passages can be present in the head, said bores each opening into the annular gap space.

A first annular sealing bead having a first end face which forms the first sealing face is preferably configured on the side of the head that faces the intermediate part, or on the side of the intermediate part that faces the head.

The sealing bead offers the advantage that reliable fluidic sealing can be provided while forming an annular sealing face, wherein adhesive forces between the intermediate part and the intermediate valve member can be reduced or minimized, respectively, at the same time.

A second annular sealing bead having a second end face which forms the second sealing face is preferably configured on the side of the head that faces the intermediate part, or on the side of the intermediate part that faces the head.

In design embodiments in which the sealing bead is configured on the head, a planar face of the intermediate part that lies opposite the sealing bead typically forms the intermediate valve seat. In design embodiments in which the sealing bead is configured on the intermediate part, the end face of the sealing bead typically forms the intermediate valve seat as well as the sealing face which interacts in a sealing manner with a planar face of the head that lies opposite the sealing bead. In design embodiments in which the first as well as the second sealing bead are configured on the intermediate part, the intermediate valve seat can therefore comprise the end face of the first sealing bead as well as the end face of the second sealing bead.

Both the first sealing bead and the second sealing bead are preferably configured on the head, or both are configured on the intermediate part. However, it is also conceivable that one of the sealing beads is configured on the head and the other one of the sealing beads is configured on the intermediate part.

In one design embodiment, the intermediate part on the side that faces the head has at least one gradation in the radial direction, and the head on the side that faces the intermediate part has at least one gradation in the radial direction, wherein in the shut position of the intermediate valve member mutually offset edges of the gradations of the intermediate part and of the head radially delimit in each case the first and/or the second annular sealing face.

The gradation of the intermediate part or of the head is typically configured so as to encircle the shaft or the guiding recess. The gradation of the intermediate part or of the head can be configured by an undercut or a protrusion. The gradation of the intermediate part and/or of the head can have vertical and horizontal faces in terms of the longitudinal axis. Alternatively or additionally however, the gradation can also have a chamfered or curved face. In this context, a step which is formed by a periphery of the head or of the intermediate part can in particular also be considered to be a gradation. The dimension of the first and/or second annular sealing face can advantageously be adapted by suitable dimensions of the gradations. Furthermore, as a result of a suitable configuration of gradations and/or a combination with one or a plurality of sealing beads, one or a plurality of intermediate spaces, in particular annular gap spaces, can be configured in the shut position of the intermediate valve member, one or a plurality of passages such as, for example, valve chamber passages, high-pressure fuel supply ports, etc., potentially opening into said intermediate spaces.

In one design embodiment, a gradation of the intermediate part forms an inner annular chamber which in the shut position of the intermediate valve member is delimited by the intermediate part, the shaft and the head.

The shaft is preferably guided permanently in the guiding recess of the intermediate part.

The housing of the fuel injection valve preferably has a housing body having the high-pressure fuel inlet, and a nozzle body on which the injection valve seat is configured. The intermediate part, and thus the intermediate valve, are preferably disposed in the nozzle body. When viewed in the longitudinal direction, this advantageously enables a short embodiment of the housing body and also of the injection valve member.

In a further design embodiment, the housing has a housing body having the high-pressure fuel inlet, as well as a nozzle body on which the injection valve seat is configured, wherein however the intermediate part, and thus the intermediate valve, are disposed between the housing body and the nozzle body. This advantageously permits a slim configuration of the nozzle body.

In one design embodiment, the guiding recess is configured in the manner of a blind bore (open in the direction toward the control chamber), wherein in an outlet bore from the guiding recess, preferably from the base of the latter, to the low-pressure fuel return is configured on the intermediate part. This outlet bore, when viewed from the guiding recess, is preferably configured so as to taper in stages.

Alternatively thereto, two-part solutions can also be applied, as are disclosed, for example, in FIGS. 2 to 4, 8 and 9 of WO 2016/041739 A1, or in FIGS. 2, 4, 5, 7 and 8 of WO 2007/098621 A1. For example, an intermediate element may adjoin above the intermediate part, wherein the outlet bore can be configured in the intermediate element and the guiding recess can be configured as a continuous bore in the intermediate part. The intermediate element is preferably configured in the shape of a plate.

The valve chamber typically comprises the chamber delimited by the intermediate valve member and the guiding recess, in particular the chamber delimited by the end side of the shaft that faces the low-pressure fuel return, the outlet bore and optionally the blind bore in the intermediate valve member.

The throat of the outlet bore that faces the low-pressure fuel return preferably forms the low-pressure outlet.

In a further design embodiment, the housing has a housing body having the high-pressure fuel inlet, and a nozzle body on which the injection valve seat is configured, wherein an intermediate body is disposed between the housing body and the nozzle body, and the intermediate part is disposed in the intermediate body, or is preferably received by the latter, respectively. For this purpose, the intermediate body preferably has a receptacle recess which is open in the direction toward the nozzle body and connected to the high-pressure chamber and in which the intermediate part is disposed. The intermediate body here can be part of the actuator assembly.

A tappet of the actuator assembly preferably runs through a corresponding passage in the intermediate body so as to close or release, respectively, the low-pressure outlet configured on the intermediate part. The intermediate body here preferably forms a guide element for the tappet. The housing body preferably bears in a sealing manner on one end side of the intermediate body, and the nozzle body bears in a sealing manner on the opposite end side of the intermediate body.

In one design embodiment, the guiding recess on the side that faces the control chamber is delimited by a shoulder which is configured on the intermediate part and is set back in relation to the end side that faces the nozzle body, wherein this shoulder can have the intermediate valve seat. As a result, a head space in which the head of the intermediate valve member can be received can be formed between this shoulder and the end side of the intermediate part that faces the nozzle body. This embodiment offers the possibility of configuring the guide part in a simple manner, because the end of the latter that faces the intermediate part can form a detent for delimiting the stroke of the intermediate valve member.

The guide part is preferably formed by a circular-cylindrical guide sleeve on which the compression spring is supported, wherein the compression spring presses the guide sleeve in a sealing manner onto the intermediate part as a result.

In the operation of the fuel injection valve, the throttle passage can be temporarily closed in order to reduce the loss of fuel. This may be the case as set forth in the paragraph hereunder, on the one hand. On the other hand, there is also the possibility for the throttle passage to be temporarily closed by a shut-off valve, as is known, for example, from WO 2018/162747 A1 and DE 195 16 565 A1.

In one design embodiment, the control piston of the injection valve member on the side thereof that faces the intermediate valve has a cam-shaped protrusion which, when bearing on the intermediate valve member, can close the throttle passage.

The invention furthermore relates to a fuel injection valve for intermittently injecting fuel into the combustion chamber of an internal combustion engine, having a housing which defines a longitudinal axis and has a high-pressure fuel inlet and an injection valve seat; a high-pressure chamber which is disposed in the housing and runs from the high-pressure fuel inlet to the injection valve seat; an injection valve member which is disposed in the housing so as to be adjustable in the direction of the longitudinal axis and interacts with the injection valve seat; a compression spring which impinges the injection valve member with a closing force directed in the direction towards the injection valve seat; a guide part in which a control piston of the injection valve member is guided in a sliding fit; an intermediate part which, conjointly with the guide part and the control piston, delimits a control chamber; a hydraulic control device for controlling the axial movement of the injection valve member by modifying the pressure in the control chamber, having an intermediate valve comprising an intermediate valve member which is configured in the shape of a mushroom and has a shaft, guided in a guiding recess of the intermediate part, and a head, and an intermediate valve seat which is configured on a side of the intermediate part that faces the head and which interacts with the head, wherein the intermediate valve member in an open position releases a first connection between a high-pressure fuel supply port, which is connected to the high-pressure chamber, and the control chamber, and in a shut position interrupts the first connection between the high-pressure fuel supply port and the control chamber as well as, with the exception of a throttle passage, separating the control chamber from a valve chamber; an electrically activatable actuator assembly for connecting the valve chamber to and separating the valve chamber from a low-pressure fuel return; wherein the intermediate valve member in the open position releases a second connection between the high-pressure fuel supply port and the valve chamber, and in the shut position interrupts the second connection between the high-pressure fuel supply port and the valve chamber.

As a result of the intermediate valve member in the open position releasing a second connection between the high-pressure fuel supply port and the valve chamber, the valve chamber can be filled with fuel by way of the second connection, this enabling a more rapid opening movement of the intermediate valve member. In particular, the second connection improves the filling of the valve chamber in comparison to a fuel injection valve in which the filling of the valve chamber takes place solely from the control chamber by way of a throttle passage, for example. Therefore, the valve chamber can advantageously already be filled by way of the second connection in the event of a small opening movement of the intermediate valve member. As for the throttle passage, it is advantageously sufficient here for the throughput of the fuel from the control chamber into the valve chamber by way of the throttle passage to cause the initially small opening movement of the intermediate valve member, because the valve chamber can then be filled with a large quantity of fuel by way of the second connection.

As a result of the intermediate valve member in the shut position interrupting the second connection between the high-pressure fuel supply port and the valve chamber, it can advantageously be avoided that fuel by way of the second connection flows from the high-pressure chamber into the low-pressure fuel return in the shut position of the intermediate valve member. In examples in which additional filling of the valve chamber is achieved by a secondary passage in the intermediate part or in the intermediate valve member, said secondary passage permanently connecting the high-pressure chamber and the valve chamber, the fuel by way of the valve chamber can also flow into the low-pressure fuel return during the injection procedure, i.e. in the shut position of the intermediate valve member, which may result in a disadvantageous loss of fuel and increased wear as a result of the fuel from the high-pressure chamber relaxing. By interrupting the second connection between the high-pressure fuel supply port and the valve chamber in the shut position of the intermediate valve member, a disadvantageous loss of fuel and the wear as a result of the fuel from the high-pressure chamber relaxing into the valve chamber during the injection procedure can be reduced or minimized, respectively, and rapid filling of the valve chamber for the opening movement of the intermediate valve member can be achieved at the same time.

In one design embodiment, the second connection runs between the high-pressure fuel supply port and a bore running through the shaft of the intermediate valve member, said bore being part of the valve chamber. The bore is preferably configured as a blind bore.

In one design embodiment, the head in the shut position of the intermediate valve member, by way of a side that faces the intermediate part, across a first sealing face that runs at a first radial spacing about the shaft or the guiding recess, while forming a first annular sealing face inherently closed in the encircling direction, and across a second sealing face that runs at a second radial spacing about the shaft or the guiding recess, while forming a second annular sealing face inherently closed in the encircling direction, bears on the intermediate valve seat, wherein the first radial spacing is larger than the second radial spacing.

In one design embodiment, a first annular sealing bead, having a first end face which forms the first sealing face, is configured on that side of the head that faces the intermediate part or on that side of the intermediate part that faces the head.

In one design embodiment, a second annular sealing bead, having a second end face which forms the second sealing face, is configured on that side of the head that faces the intermediate part or that side of the intermediate part that faces the head.

In one design embodiment, the intermediate part on the side that faces the head has at least one gradation, and the head on the side that faces the intermediate part has at least one gradation, wherein, in the shut position of the intermediate valve member, mutually offset edges of the gradations of the intermediate part and of the head radially delimit in each case the first and/or the second annular sealing face.

In one design embodiment, a gradation of the intermediate part forms an inner annular chamber which in the shut position of the intermediate valve member is delimited by the intermediate part, the shaft and the head.

In one design embodiment, the high-pressure fuel supply port in the intermediate part runs in such a manner that the high-pressure fuel supply port in the shut position of the intermediate valve member opens into an annular gap space which in the shut position of the intermediate valve member is configured between the intermediate part and the head and is radially delimited by the first and the second annular sealing face.

In one design embodiment, the second connection comprises a supply port of the intermediate valve member which by way of a first end opens into the valve chamber and by way of a second end opens toward an external side of the intermediate valve member. As has already been explained above, the valve chamber can advantageously be filled by way of the supply port, so as to facilitate the opening movement of the intermediate valve member. The supply port by way of the first end preferably opens into the blind bore that runs through the shaft and is part of the valve chamber.

In one design embodiment, the supply port by way of the second end opens toward the external side of the intermediate valve member in such a manner that the second end in the shut position of the intermediate valve member is disposed at a radially smaller spacing from the shaft than the second annular sealing face.

In one design embodiment, the second connection comprises a passage which is formed by a clearance present in the radial direction between the shaft and the guiding recess, said clearance being at least 10 μm, preferably between 20 μm and 50 μm.

In one design embodiment, the shaft has two annular protrusions that are mutually spaced apart in the longitudinal direction of the shaft.

In one design embodiment, the annular protrusions in the encircling direction each have at least one chamfer, wherein the second connection comprises a passage which is formed by an intermediate space between the at least one chamfer and the guiding recess. As a result of the at least one chamfer, the clearance between the shaft and the guiding recess can be kept sufficiently small, this permitting improved centering of the shaft, i.e. while avoiding or minimizing, respectively, an eccentric or inclined orientation of the shaft. By virtue of the at least one chamfer between the external side of the shaft and the guiding recess, a sufficient pathway, formed by the intermediate space between the at least one chamfer and the guiding recess, can be provided at the same time despite the minor clearance, said pathway serving as the passage of the second connection.

In one design embodiment, the annular protrusions in the circumferential direction each have two or three chamfers.

In one design embodiment (without annular protrusions), the shaft in the circumferential direction has at least one chamfer, wherein the second connection comprises a passage which is formed by an intermediate space between the at least one chamfer and the guiding recess. As has already been explained, the clearance between the shaft and the guiding recess can be kept sufficiently small as a result of the at least one chamfer, this permitting improved centering of the shaft, i.e. while avoiding or minimizing, respectively, an eccentric or inclined orientation of the shaft. By virtue of the at least one chamfer between the external side of the shaft and the guiding recess, a sufficient pathway, formed by the intermediate space between the at least one chamfer and the guiding recess, can be provided at the same time despite the minor clearance, said pathway serving as the passage of the second connection.

In one design embodiment, the shaft in the circumferential direction has two or three chamfers.

In one design embodiment, the second connection comprises a bore which runs through the head of the intermediate valve member and at least partially forms a valve chamber passage, which is connected to the valve chamber, and by way of one end opens out on a side of the head that faces the intermediate part.

In one design embodiment, the valve chamber passage in the intermediate valve member runs in such a manner that the valve chamber passage in the shut position of the intermediate valve member opens into an annular gap space which in the shut position of the intermediate valve member is configured between the intermediate part and the head and is radially delimited by the first and the second annular sealing face.

In one design embodiment, the fuel injection valve has an annular chamber which in the shut position of the intermediate valve member is delimited by the intermediate part, the shaft and the head and into which the high-pressure fuel supply port opens.

LIST OF THE FIGURES

Embodiments of the invention will be explained in more detail by means of the following figures and the associated description. In the schematic figures.

Figure 2:
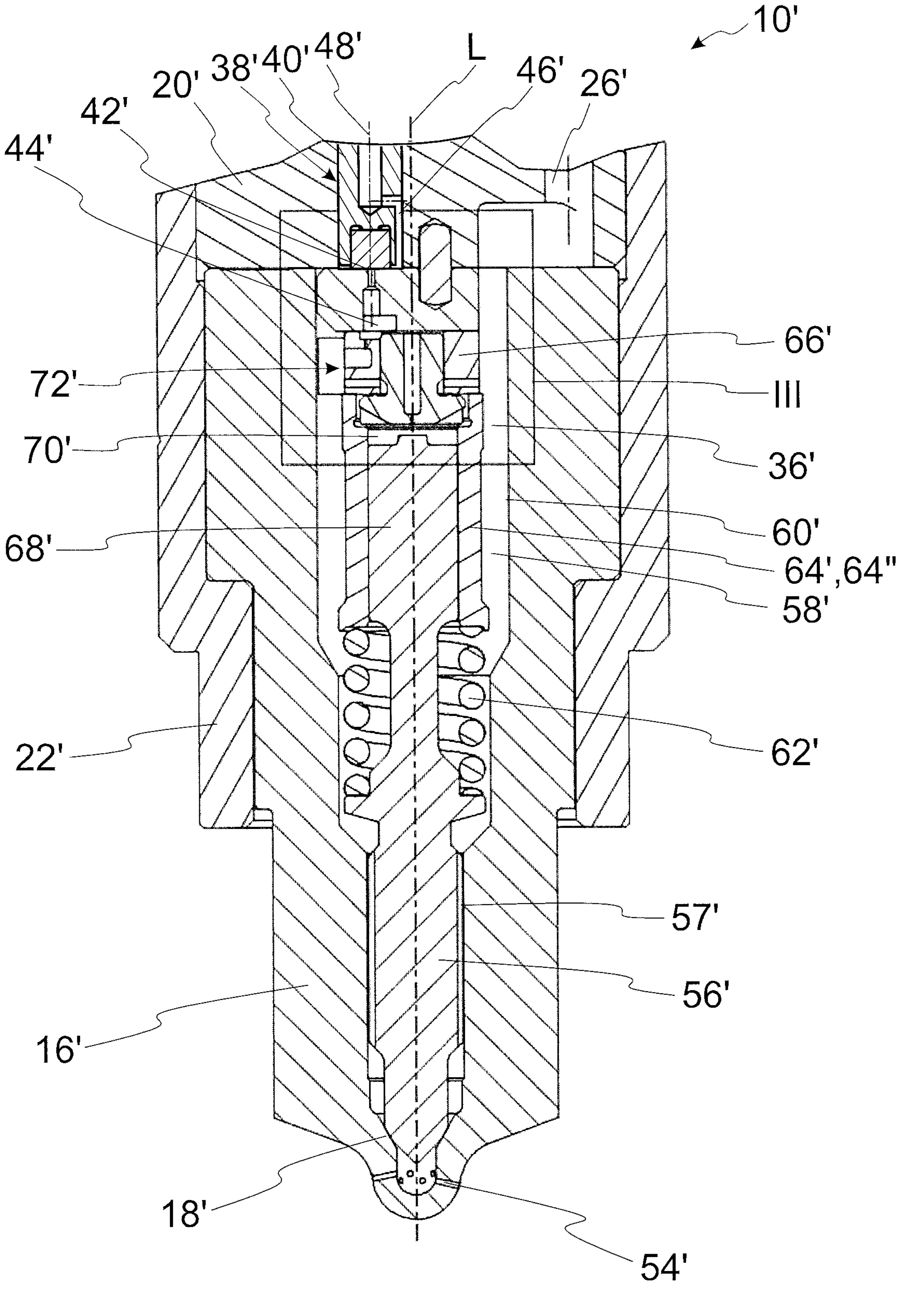
FIG. 2 shows the part of the fuel injection valve from the prior art that in FIG. 1 is bordered by a rectangle denoted with II, so as to be enlarged in comparison to FIG. 1.
Figure 5A:
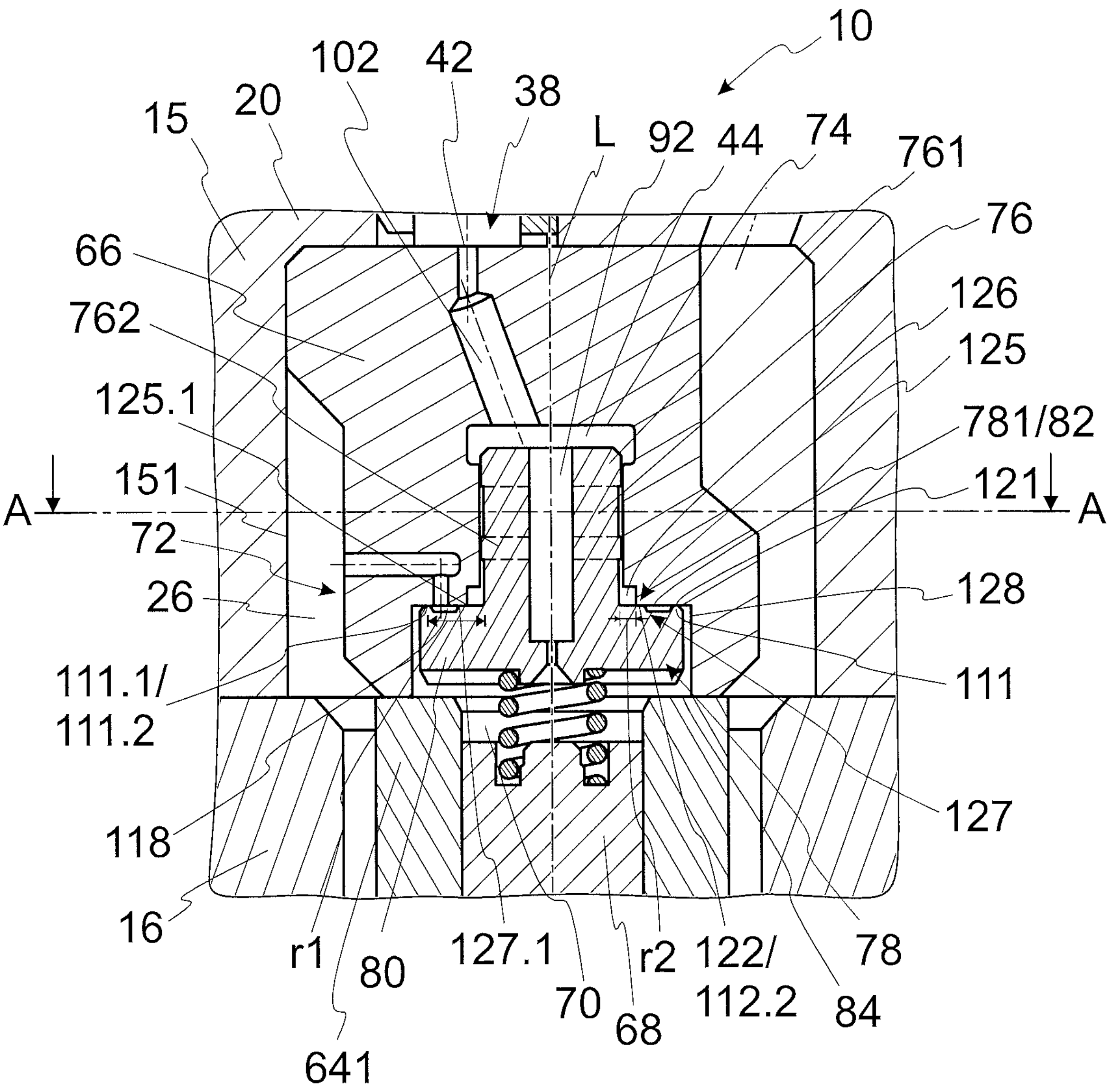
Figure 5B:
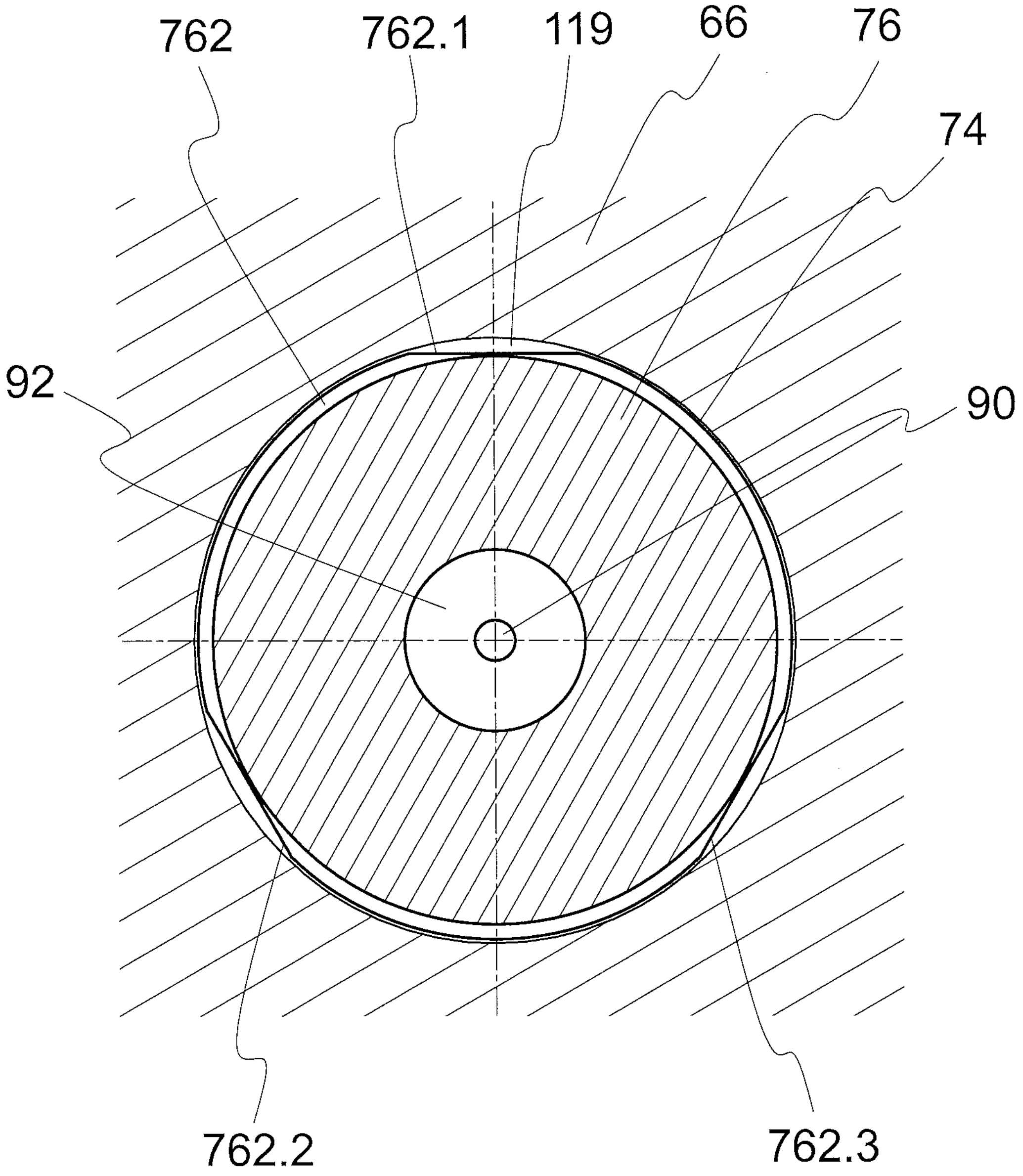
Figure 6:
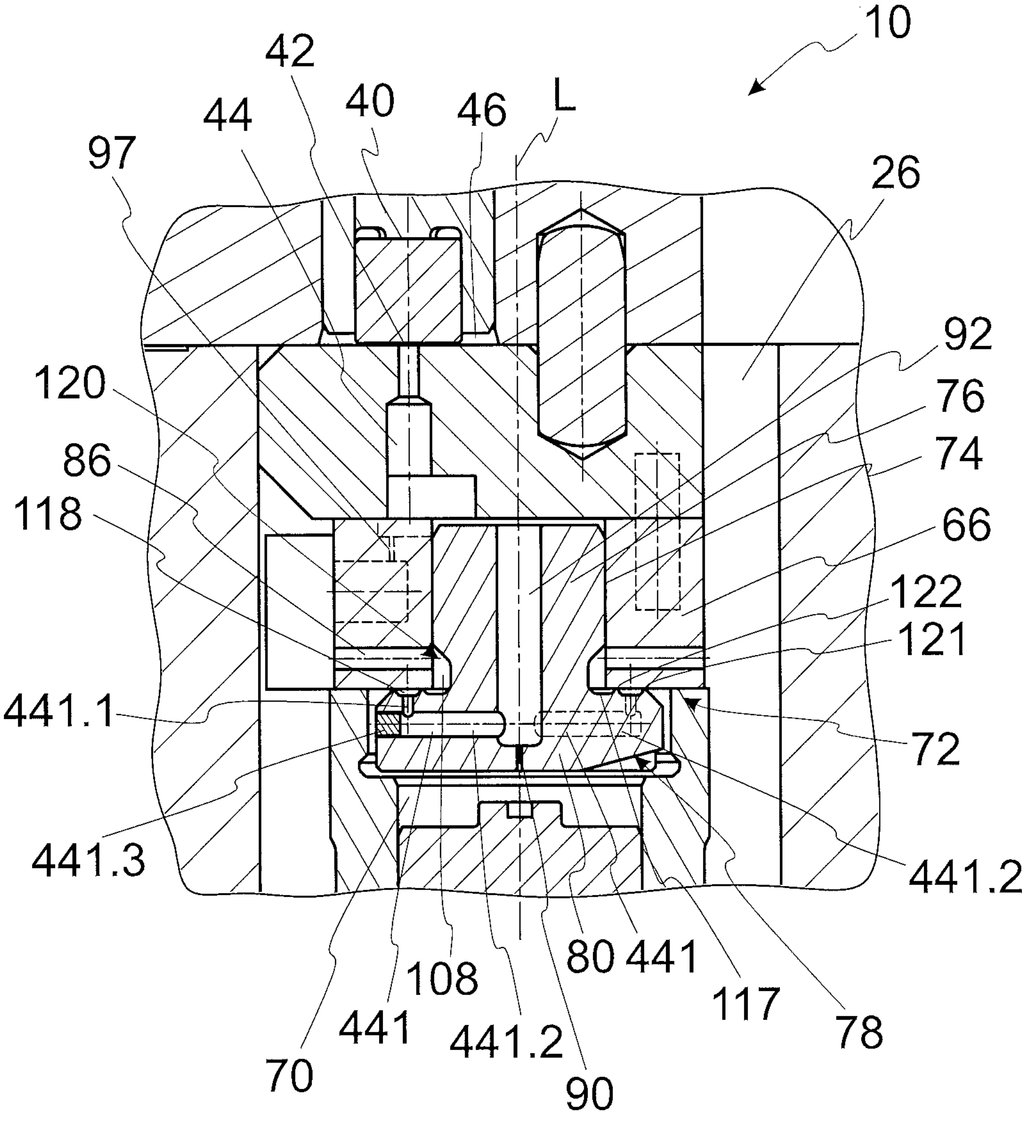
Figure 7:
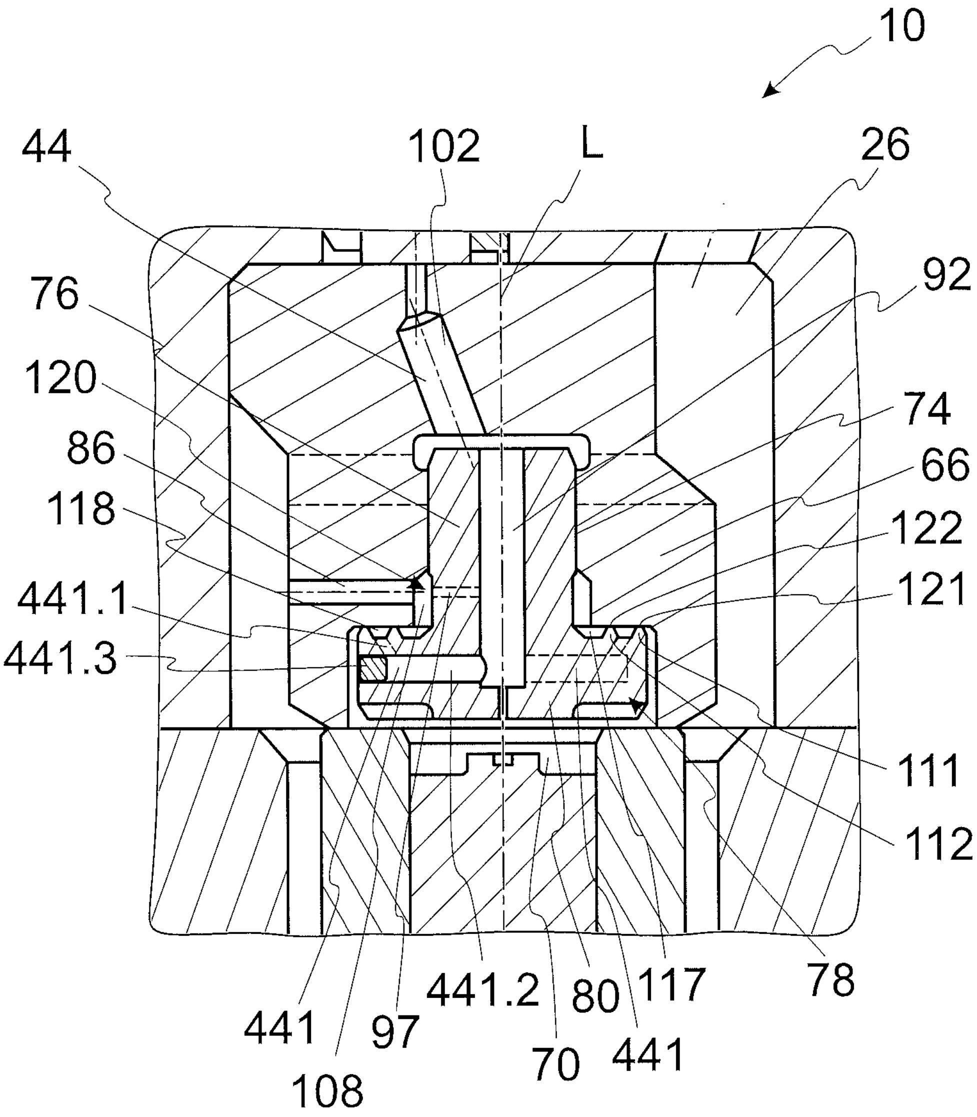

FIG. 5*a* shows a fragment of a third embodiment of a fuel injection valve according to the invention in a longitudinal section, wherein the fragment represents a region of the fuel injection valve that corresponds to the rectangle denoted with III in FIG. 2;

FIG. 5*b* shows a fragment of a horizontal sectional illustration of a further embodiment of a fuel injection valve according to the invention;

FIG. 6 shows a fragment of a fourth embodiment of a fuel injection valve according to the invention in a longitudinal section, wherein the fragment represents a region of the fuel injection valve that corresponds to the rectangle denoted with III in FIG. 2; and FIG. 7 shows a fragment of a fifth embodiment of a fuel injection valve according to the invention in a longitudinal section, wherein the fragment represents a region of the fuel injection valve that corresponds to the rectangle denoted with III in FIG. 2.

DESCRIPTION OF EXEMPLARY EMBODIMENTS

The same reference signs are used for equivalent parts of the embodiments in the description of the figures.

Figure 1:
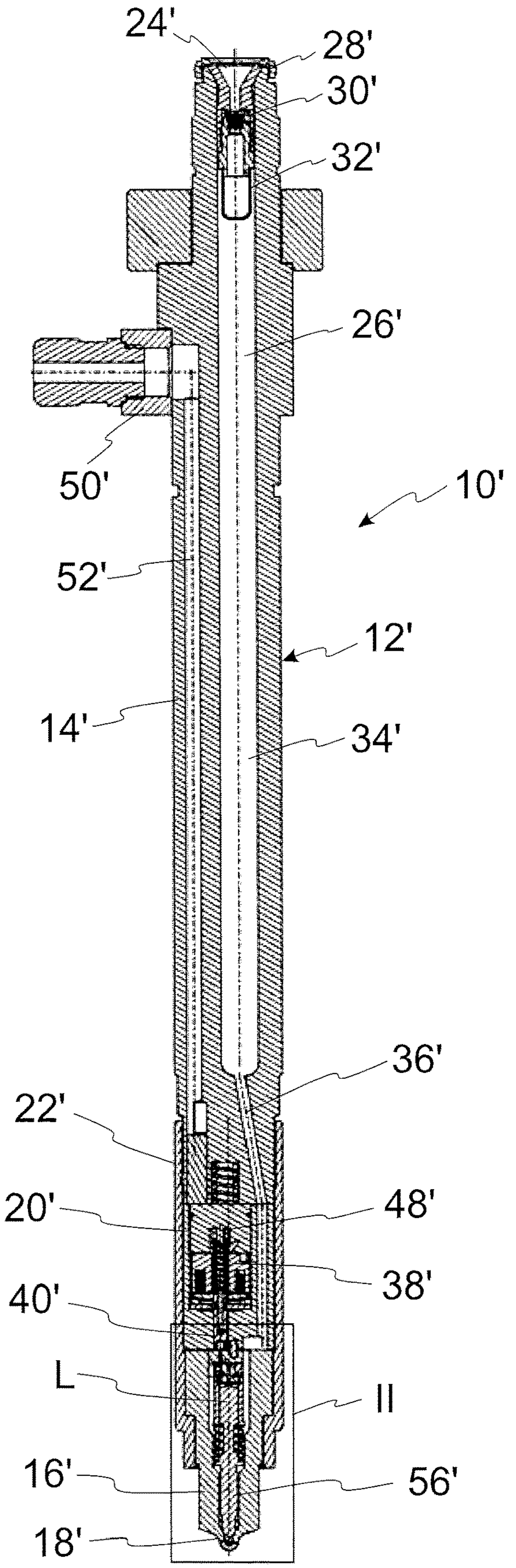
FIG. 1 shows an illustration of a fuel injection valve from the prior art in a longitudinal section.

FIG. 1 shows a fuel injection valve 10' according to WO 2016/041739 A1 for intermittently injecting fuel into a combustion chamber of an internal combustion engine. The fuel here is highly pressurized, for example to a pressure of up to 2000 bar or more.

The fuel injection valve 10' has a housing 12' which defines a longitudinal axis L and has a housing body 14', a nozzle body 16' on which an injection valve seat 18' is configured, and an actuator receptacle body 20' which is disposed between the housing body 14' and the nozzle body 16'. A union nut 22' that is supported on the nozzle body 16' receives the actuator receptacle body 20' and by way of a thread is fitted to the housing body 14'. The housing body 14' and the actuator receptacle body 20', as well as the latter and the nozzle body 16', bear on one another on the end sides, are mutually compressed in a sealing manner by means of the union nut 22', and are aligned to one another in the direction of the longitudinal axis L.

The external shape of the housing 12', in a manner known, is at least approximately circular-cylindrical.

A high-pressure fuel inlet 24' is disposed on the end side of the housing body 14' that faces away from the nozzle body 16', a high-pressure chamber 26' from the high-pressure fuel inlet 24' running in the interior of the housing 12'-through the housing body 14', the actuator receptacle body 20' and the nozzle body 16'-up to the injection valve seat 18'. The high-pressure fuel inlet 24' is formed by a valve carrier 28' which carries a check valve 30' and a basket-type perforated filter 32' for retaining potential foreign particles in the fuel. The disk-shaped valve member of the check valve 30', which interacts with a valve seat configured on the valve carrier 28', has a bypass bore.

The check valve 30', in a manner known, allows fuel supplied by way of a high-pressure supply line to flow practically unimpeded into the high-pressure chamber 26', but does prevent the outflow of fuel from the high-pressure chamber 26' into the high-pressure supply line, with the exception of the path by way of the bypass.

The construction and the functional mode of the module configured as a cartridge, having the valve carrier 28', the check valve 30' and the perforated filter 32', are disclosed in document WO 2014/131497 A1. The high-pressure fuel inlet 24' and the valve carrier 28' having the check valve 30' and the perforated filter 32' can also be configured as disclosed in document WO 2013/117311 A1. A potential embodiment of the high-pressure fuel inlet 24' and of the check valve 30', as well as a tubular filter instead of the perforated filter 32', is known from document WO 2009/033304 A1. The corresponding disclosure of the documents mentioned above is considered to be incorporated in the present disclosure by reference.

Adjoining the valve carrier 28', the high-pressure chamber 26' has a discrete storage chamber 34' which is configured on the housing body 14' and at the other side is connected to the injection valve seat 18' by way of a flow duct 36' of the high-pressure chamber 26'.

The dimensions and the functional mode of the discrete storage chamber 34', conjointly with the check valve 30' having the bypass, are disclosed in document WO 2007/009279 A1; the corresponding disclosure is considered to be incorporated in the present disclosure by reference.

Instead of the check valve 30', a stationary, immovable throttle may also be provided in specific embodiments.

An electrically activated actuator assembly 38' is received in a manner known in a recess of the actuator receptacle body 20', said actuator assembly 38' which by way of the tappet 40' thereof that is spring-loaded in one direction and in the other direction is movable by means of a solenoid of the actuator assembly 38' is specified for closing a low-pressure outlet 42', so as to separate a valve chamber 44' from a low-pressure fuel return 46' (see FIG. 2), and for releasing the low-pressure outlet 42', so as to connect the valve chamber 44' and the low-pressure fuel return 46' to one another. The longitudinal axis, denoted with 48', of the tappet 40' and thus of the actuator assembly 38' runs so as to be parallel and eccentric to the longitudinal axis L.

A duct 52' in which the electric control line for controlling the actuator assembly 38' is received runs from an electric connector 50' through the housing body 14' to the actuator assembly 38', said duct 52' running so as to be parallel to the discrete storage chamber 34' disposed so as to be eccentric in terms of the longitudinal axis L of the housing 12' and thus of the fuel injection valve 10'.

The tappet 40' penetrates the base of the cup-shaped actuator receptacle body 20' that forms a guide element for the tappet 40'. The tappet 40' has guide wings which project in the radial direction and by way of which said tappet 40' is guided so as to be displaceable in a sliding manner, parallel to the longitudinal direction L, on the guide element. The guide wings form passages running in the longitudinal direction L, by way of which passages the fuel can flow from the low-pressure outlet 42' to the low-pressure fuel return 46'.

FIG. 2 shows an enlarged fragment of the fuel injection valve of FIG. 1 in the region of the rectangle denoted with II.

The conical injection valve seat 18', which by way of the flow duct 36' is connected directly to the storage chamber 34' and thus to the high-pressure fuel inlet 24', is integrally molded on the nozzle body 16'.

When viewed in the flow direction of the fuel, injection openings 54', by way of which, in the event of an injection valve member 56' being lifted from the injection valve seat 18', the very highly pressurized fuel is injected into the combustion chamber of the internal combustion engine, are configured in a manner known in a semi-spherical free end region of the nozzle body 16' downstream of the injection valve seat 18'.

The injection valve member 56' is configured in the shape of a needle and interacts with the injection valve seat 18'. The injection valve member 56' is guided so as to be movable in the direction of the longitudinal axis L in a guide bore 57' in the nozzle body, said guide bore 57' being concentric with the longitudinal axis L and associated with the high-pressure chamber 26', wherein the flow of fuel to the injection valve seat 18' and to the injection openings 54' with minor losses is made possible by recesses on the injection valve member 56', said recesses running in the longitudinal direction and in the radial direction being open toward the outside.

The interior space 58' of the nozzle body 16', which is associated with the high-pressure chamber 26', is configured upstream of this guide bore 57', so as to widen twofold toward the actuator receptacle body 20', wherein the portion of the interior space 58' which, so as to be approximately longitudinally centric to the nozzle body 16', runs up to the end side of the latter that faces the actuator receptacle body 20' defines a portion 60' of the nozzle body 16' which has a constant cross section and is circular-cylindrical on the inside.

A support ring, on which a compression spring 62' by way of one end thereof is supported, is integrally molded on the injection valve member 56' between this portion 60' and the guide bore 57'. The compression spring 62', by way of the other end thereof, on the end side is supported on a guide sleeve 64" that forms a guide part 64'. The compression spring 62' impinges the injection valve member 56' with a closing force acting in the direction toward the injection valve seat 18'. On the other hand, the compression spring 62' holds the guide part 64', or the guide sleeve 64", respectively, by way of the end side thereof that faces away from the compression spring 62', so as to bear in a sealing manner on an intermediate part 66'. The guide part 64' can be configured in a form other than that of a sleeve, for example as a cuboid or an annular body.

A dual-action control piston 68', which is integrally molded on the injection valve member 56', is guided in a tight sliding fit of approx. 3 μm to 5 μm in the guide part 64', or in the guide sleeve 64", respectively, so as to be displaceable in the direction of the longitudinal axis L. The control piston 68', the guide part 64', or the guide sleeve 64", respectively, and the intermediate part 66' delimit a control chamber 70' in relation to the high-pressure chamber 26'. The intermediate part 66' is part of a hydraulic control device 72'.

Figure 3:
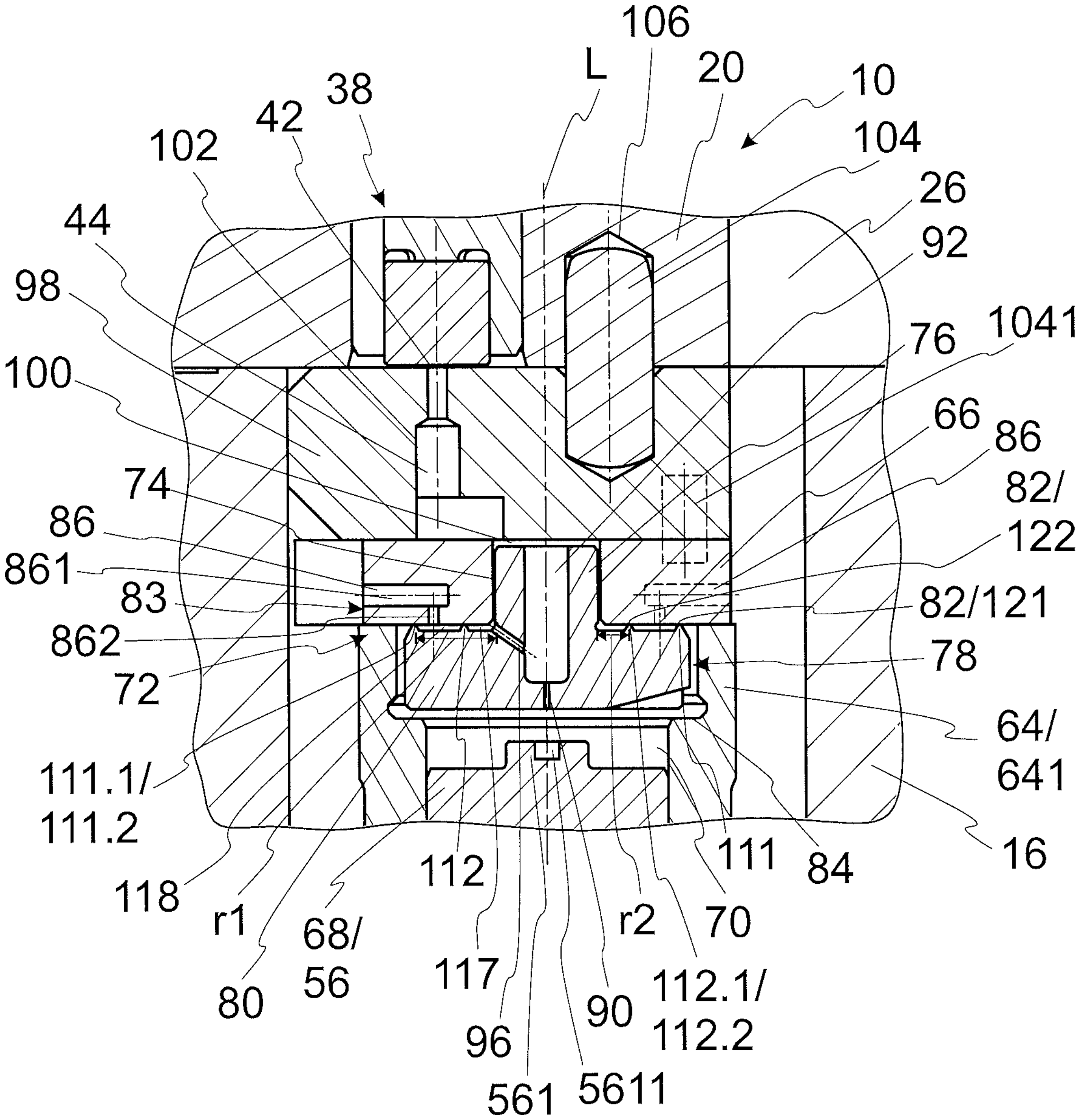
FIG. 3 shows a fragment of a first embodiment of a fuel injection valve according to the invention in a longitudinal section, wherein the fragment represents a region of the fuel injection valve that corresponds to the rectangle denoted with III in FIG. 2.

FIG. 3 shows a fragment of a first embodiment of a fuel injection valve 10 according to the invention in a longitudinal section. The fragment represents a region of the fuel injection valve 10 that corresponds to the rectangle denoted with III in FIG. 2, wherein the specific design embodiment of this region of the first embodiment of the fuel injection valve 10 according to the invention differs from the fuel injection valve 10' according to WO 2016/041739 A1 shown in FIG. 2 in particular in terms of the hydraulic control device 72, this being described hereunder with reference to FIG. 3. The remaining region of the first embodiment of the fuel injection valve 10 outside the rectangle denoted with III corresponds substantially to the fuel injection valve 10' shown in FIGS. 1 and 2. This also applies in an analogous manner to the fragments of the further embodiments of the fuel injection valve 10 according to the invention, which are shown in FIGS. 4 to 7.

A circular-cylindrical guiding recess 74 runs through an intermediate part 66, from the planar end side that faces the control chamber 70 to the likewise planar end side that faces away from the control chamber 70. A shaft 76 of an intermediate valve member 78 which is configured in the shape of a mushroom is guided in said guiding recess 74. A head 80 of the intermediate valve member 78, which is configured so as to be integral to the shaft 76, is situated in the control chamber 70 and, by way of the side thereof that faces the intermediate part 66, interacts with the intermediate part 66, the planar end side thereof forming an annular intermediate valve seat 82.

The intermediate valve member 78, conjointly with the intermediate valve seat 82 configured on the intermediate part 66, forms an intermediate valve 83.

A first toroidal sealing bead 111 which has a first end face 111.1 that forms the first sealing face 111.2 and which runs at a first radial spacing r1 about the shaft 76 is configured on the side of the head 80 that faces the intermediate part 66. A second toroidal sealing bead 112 which has a second end face 112.1 that forms the second sealing face 112.2 and which runs at a second radial spacing r2 about the shaft 76 is furthermore configured on the side of the head 80 that faces the intermediate part 66. As is shown in FIG. 3, the intermediate valve member 78 is situated in the shut position in which the head 80, by way of the side thereof that faces the intermediate part 66, across the first sealing face 111.2, while forming a first annular sealing face 121 inherently closed in the encircling direction, and across the second sealing face 112.2, while forming a second annular sealing face 122 inherently closed in the encircling direction, bears on the intermediate valve seat 82. The first radial spacing r1 here is larger than the second radial spacing r2 from the shaft 76.

A high-pressure fuel supply port 86 which is connected to the high-pressure chamber 26 and comprises a horizontal bore 861 and a vertical bore 862 runs in the intermediate part 66. The vertical bore 862 in the shut position of the intermediate valve member 78 opens into an annular gap space 118 which is configured between the intermediate part 66 and the head 80 and is radially delimited by the first and the second annular sealing face 121, 122. As can be seen in FIG. 3, a plurality of high-pressure fuel supply ports 86 can be provided. A second, optional high-pressure fuel supply port 86 is thus shown with dashed lines in the region of the intermediate part 66 that is on the right in FIG. 3.

A clearance of preferably at least 10 μm is present in the radial direction between the shaft 76 and the guiding recess 74. However, the clearance may also be smaller, for example between 3 and 10 μm. In further embodiments, the clearance may in each case be larger and have a value of, for example, between 20 μm and 50 μm. The second radial spacing r2 of the second annular sealing face 122 from the shaft 76 here is larger than the clearance (for example several 1/10 mm larger). By virtue of the high-pressure fuel supply port 86 in the shut position of the intermediate valve member 78 being sealed by the annular sealing faces 121, 122, the possibility of additional leakages into the valve chamber 44, generated as a result of the clearance between the shaft 76 and the guiding recess 74, is minimized or negligible. Moreover, it is apparent that the shaft 76 for this reason can be configured so as to be shorter along the longitudinal axis L in comparison to the prior art such as, for example, in the fuel injection valve of WO 2016/041739 A1. Furthermore, the intermediate part 66 can also be designed so as to be shorter in the direction of the longitudinal axis L, so that a more compact construction mode is made possible.

Despite the reliable sealing of the high-pressure fuel supply port 86 in the shut position of the intermediate valve member 78, the adhesion between the head 80 and the intermediate part 66 remains minor thanks to the sealing of the intermediate valve member 78 implemented by the two annular sealing faces 121, 122.

An intermediate element 98, through which an outlet bore 102 that tapers in a staged manner and at the one side by way of one end is connected to the guiding recess 74 and by way of another end forms the low-pressure outlet 42, is disposed above and adjoining the intermediate part 66 in FIG. 3. The outlet bore 102 is disposed so as to be eccentric in terms of the longitudinal axis L. In specific embodiments, the intermediate element 98 is configured so as to be integral to the intermediate part 66, i.e. as a single-piece intermediate part, in which the guiding recess is configured as a blind bore (see FIG. 5*a*, for example).

The length of the shaft 76 in the direction of the longitudinal axis L is sized in such a manner in comparison to the guiding recess 74 that a flow gap 100 between the end side of the shaft 76 that faces the outlet bore 102 and the intermediate element 98 remains in the shut position of the intermediate valve member 78.

The intermediate valve member 78 has a supply port 96 which by way of a first end opens into a blind bore 92 that runs through the shaft 76 and is part of the valve chamber 44, and by way of a second end at the external side of the intermediate valve member 78 opens toward a line on which the shaft 76 adjoins the head 80.

In the shut position of the intermediate valve member 78, an inner annular chamber 117 is configured between the intermediate part 66 and the head 80, which inner annular chamber 117 is adjacent to the shaft 76 and the second annular sealing face 122, wherein the supply port 96 in the shut position of the intermediate valve member 78 connects the inner annular chamber 117 to the blind bore 92, or to the valve chamber 44, respectively.

The blind bore 92 runs through the shaft 76 and protrudes into the head 80. The supply port 96 is configured as a bore which is inclined in relation to the longitudinal axis L. However, in further embodiments, the supply port 96 can also be configured as a horizontal bore.

A throttle passage 90, which runs from the end side of the head 80 that faces the control piston 68 to the blind bore 92 and connects the valve chamber 44 to the control chamber 70 is configured on the head 80. The supply port 96 has a diameter which is larger than that of the throttle passage 90. While not shown in this way in the schematic FIG. 3, the diameter of the supply port 96 can also be larger than the smallest diameter of the graduated outlet bore 102.

The intermediate valve member 78 in the open position, by way of the supply port 96, releases a second connection between the high-pressure fuel supply port 86 and the valve chamber 44, so that the valve chamber 44, or the blind bore 92, respectively, can be flooded with fuel. Already in the event of a small movement of the intermediate valve member 78 away from the intermediate part 66, fuel from the high-pressure fuel supply port 86 can flow through the supply port 96 into the blind bore 92 by way of the annular gap space 118 and the inner annular chamber 117, thus supporting the opening movement of the intermediate valve member 78. In the shut position of the intermediate valve member 78, the second connection between the high-pressure fuel supply port 86 and the valve chamber 44, or the blind bore 92, respectively, is interrupted by virtue of the second sealing bead 112, or the second sealing face 112.2, respectively.

The second connection is particularly advantageous for the intermediate valve member according to the invention, which is configured in the shape of a mushroom, because the above-described rapid filling of the blind bore of the intermediate valve member for a rapid opening movement of the intermediate valve member can be achieved therewith.

The control piston 68 on the side thereof that faces the head 80 has a cam-type protrusion 561 which has a preferably circular cross section and serves as a stroke delimitation for the stroke of the injection valve member 56 and can thereby bear on the intermediate valve member 78. The cam-type protrusion 561 has a recess 5611 which extends perpendicularly to the drawing plane and by way of which fuel from the control chamber 70 can flow into the valve chamber 44, or into the blind bore 92, respectively, by way of the throttle passage 90, even 561 bears when the cam-type protrusion on the intermediate valve member 78. Therefore, the recess 5611 is configured so as to be open in the radial direction (or as shown in FIG. 3 in the direction perpendicular to the drawing plane), toward the control chamber 70.

A detent shoulder 84, which delimits the opening stroke of the intermediate valve member 78, is configured on the guide sleeve 641 so as to be spaced apart from the intermediate part 66, said guide sleeve 641 forming the guide part 64. In order to enable the fuel to flow with ideally minor losses from a high-pressure fuel supply port 86 into the control chamber 70, a sufficiently large gap is present radially on the outside, between the head 80 and the guide sleeve 641, and the head 80 on the side thereof that faces the detent shoulder 84 has wedge-type flow grooves which, when the intermediate valve member 78 is situated in the open position and the head 80 bears on the detent shoulder 84, allow the fuel to flow from the gap to the control piston 68 with minor losses. In specific embodiments, the guide part 64, or the guide sleeve 641, respectively, can be configured so as to be integral to the intermediate part 66, i.e. as a single-piece component.

The intermediate valve 83 in the shut position of the intermediate valve member 78 has the task of separating the high-pressure fuel supply port 86 from the control chamber 70 and from the valve chamber 44 and, in the open position of the intermediate valve member 78, i.e. when the head 80 is lifted from the intermediate valve seat 82, of releasing the connection between the high-pressure fuel supply port 86 and the control chamber 70 and the valve chamber 44.

The intermediate element 98 is disposed in the nozzle body 16 and by way of the planar end side thereof that faces away from the intermediate part 66 bears on the corresponding end side of the actuator receptacle body 20.

In order for the intermediate element 98 to be correctly positioned relative to the actuator receptacle body 20, and thus relative to the actuator assembly 38, the intermediate element 98 as well as the actuator receptacle body 20 have mutually aligned, mutually facing, positioning bores 106 in the manner of blind bores into which a common positioning pin 104 is inserted.

In order for the position of the intermediate part 66 in relation to the intermediate element 98 to be established, mutually aligned further positioning bores in the manner of blind bores are placed on these components, a positioning pin 1041 likewise being inserted into said positioning bores. These positioning bores lie outside the drawing plane of FIG. 3, the positioning pin 1041 for this reason being shown in dashed lines.

At least two positioning bores are typically placed on each component, said positioning bores aligning in each case in pairs with positioning bores of adjacent components so that two adjacent components are held in position relative to one another by at least two positioning pins.

Figure 4:
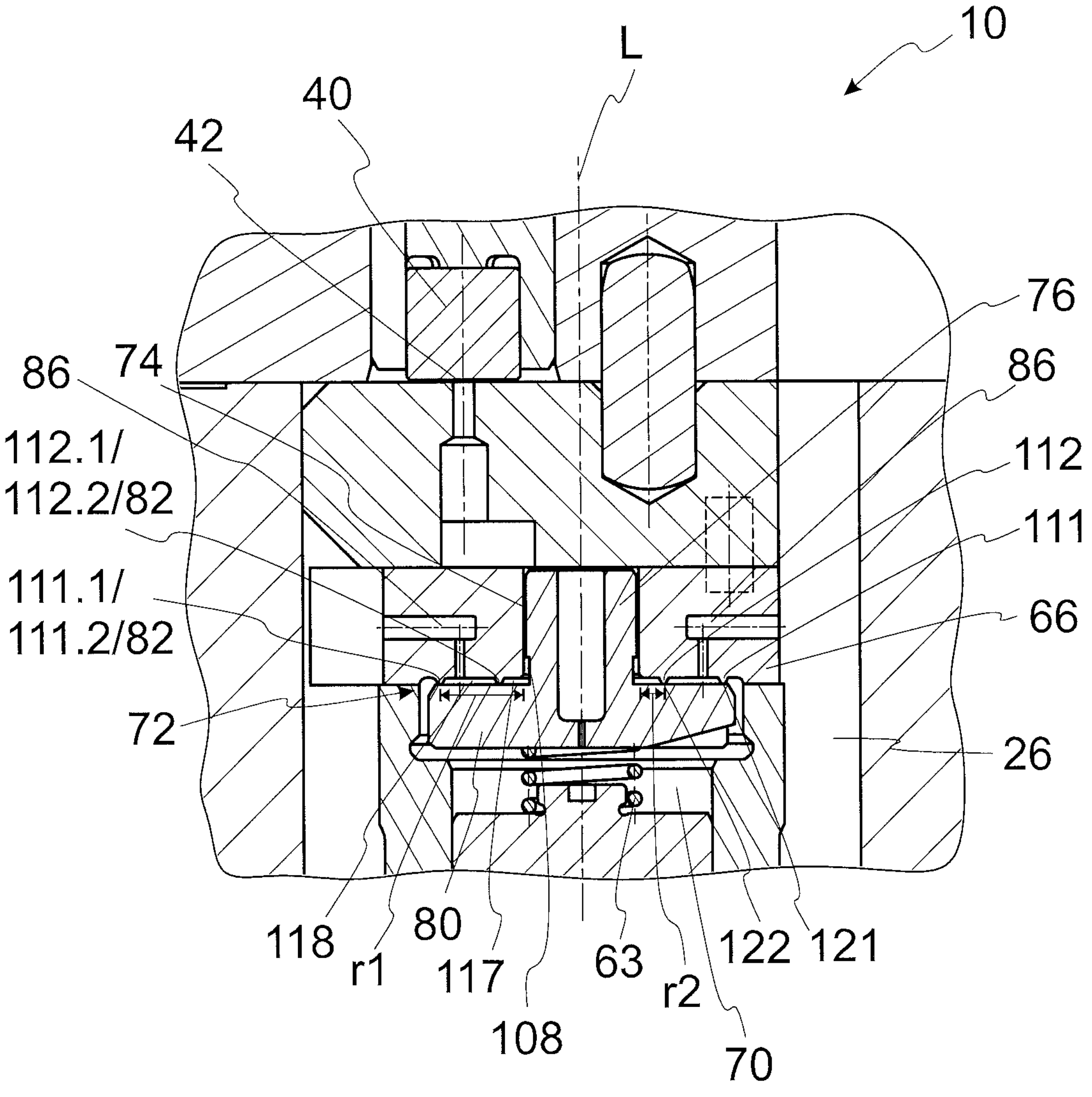
FIG. 4 shows a fragment of a second embodiment of a fuel injection valve according to the invention in a longitudinal section, wherein the fragment represents a region of the fuel injection valve that corresponds to the rectangle denoted with III in FIG. 2.

FIG. 4 shows a fragment of a second embodiment of a fuel injection valve 10 according to the invention in a longitudinal section. The fragment represents a region of the fuel injection valve 10 which corresponds to the rectangle denoted with III in FIG. 2, wherein the specific design embodiment of this region of the second embodiment of the fuel injection valve 10 according to the invention differs from the fuel injection valve 10' according to WO 2016/041739 A1, shown in FIG. 2, in particular in terms of the hydraulic control device 72.

The second embodiment of the fuel injection valve according to the invention, shown in FIG. 4, corresponds substantially to the first embodiment shown in FIG. 3, with the difference that the first and the second sealing bead 111, 112 are not configured on the head 80 but on the intermediate part 66. The first toroidal sealing bead 111, which runs at a first radial spacing r1 about the guiding recess 74, is configured on the side of the intermediate part 66 that faces the head 80, having a first end face 111.1 which forms the first sealing face 111.2. The second toroidal sealing bead 112, which runs at a second radial spacing r2 about the guiding recess 74, is also configured on the side of the intermediate part 66 that faces the head 80, having a second end face 112.1 which forms the second sealing face 112.2. At the same time, the first and the second end face 111.1, 112.1 form the intermediate valve seat 82 which in the shut position of the intermediate valve member 78 interacts in a sealing manner with the planar face of the head 80 that lies opposite the first and the second sealing bead 111, 112. Therefore, the intermediate valve seat 82 comprises the first end face 111.1 of the first sealing bead 111 as well as the second end face 112.1 of the second sealing bead 112.

As shown in FIG. 4, the intermediate valve member 78 is situated in the shut position in which the head 80 by way of the side thereof that faces the intermediate part 66 across the first sealing face 111.2, while forming a first annular sealing face 121 inherently closed in the encircling direction, and across the second sealing face 112.2, while forming a second annular sealing face 122 inherently closed in the encircling direction, bears on the intermediate valve seat 82. The first radial spacing r1 here is again larger than the second radial spacing r2 from the guiding recess 74.

The features of the high-pressure fuel supply port 86 and the effects of the sealing of the high-pressure fuel supply port 86 described in FIG. 3, as well as the features pertaining to the clearance between the shaft 76 and the guiding recess 74, can be applied in an analogous manner to the second embodiment shown in FIG. 4. In particular, the high-pressure fuel supply port 86, which runs in the intermediate part 66 and is connected to the high-pressure chamber 26, in the shut position of the intermediate valve member 78 opens in an annular gap space 118 which is configured between the intermediate part 66 and the head 80 and is radially delimited by the first and the second annular sealing face 121, 122. As is apparent in FIG. 4, two diametrically opposite, mutually corresponding high-pressure fuel supply ports 86 are configured in the intermediate part 66. Further high-pressure fuel supply ports can be configured in the intermediate part 66, for example on a plane which is vertical to the drawing plane and runs through the longitudinal axis L.

As is apparent in FIG. 4, the shaft 76 has an undercut which adjoins the head 80 and forms an internal annular chamber 108 that runs about the shaft 76 and in the radial direction is delimited by the shaft 76 and the intermediate part 66. An inner annular chamber 117 adjoins the internal annular chamber 108, said inner annular chamber 117 being adjacent to the shaft 76 and the second annular sealing face 122. In one embodiment, a further supply port (not shown in FIG. 4), configured as a horizontal bore, for example, can be disposed in the shaft 76, said further supply port connecting the blind bore 92 to the internal annular chamber 108 and being conceived for facilitating the opening procedure of the intermediate valve member 78.

In the embodiment shown in FIG. 4, the clearance between the shaft 76 and the guiding recess 74 serves as the passage of the second connection, which between the high-pressure fuel supply port 86 and the valve chamber 44 is released by the intermediate valve member 78 in the open position. Should the intermediate valve member 78, as is shown in FIG. 4, not have any supply port as part of the second connection (as is the case in the supply port 96 in FIG. 3), the clearance between the shaft 76 and the guiding recess 74 is thus preferably larger than in an embodiment with a supply port, i.e. for example larger than the clearance between the shaft and the guiding recess in FIG. 3. In the shut position of the intermediate valve member 78, the second sealing bead 112, or the annular sealing second face 122, respectively, interrupts the second connection between the high-pressure fuel supply port 86 and the valve chamber 44.

It is obvious to the person skilled in the art that, alternatively or additionally to the supply port, the clearance between the shaft and the guiding recess also in FIG. 3 also can serve as part of the second connection. In an analogous manner, alternatively or additionally to the clearance between the shaft and the guiding recess, a supply port can also serve as part of the second connection in FIG. 4.

Furthermore, a compression spring 63 is disposed between the control piston 68 and the head 80 so as to be centered about the longitudinal axis L. The compression spring 63 serves for keeping the intermediate valve member 78 in the shut position when the low-pressure outlet 42 is released by the lifted tappet 40, in that the head 80 is pressed against the intermediate part 66, this being particularly effective at the low system pressure of approx. 200 to 300 bar when the engine is idling.

FIG. 5*a* shows a fragment of a third embodiment of an fuel injection valve 10 according to the invention in a longitudinal section. The fragment represents a region of the fuel injection valve 10 that corresponds to the rectangle denoted with III in FIG. 2, wherein the specific design embodiment of this region of the third embodiment of the fuel injection valve 10 according to the invention differs from the fuel injection valve 10' according to WO 2016/041739 A1, shown in FIG. 2, in particular in terms of the hydraulic control device 72.

In a manner similar to the embodiment of the fuel injection valve shown in FIG. 3, the head 80 of the intermediate valve member 78 on the side of the head 80 that faces the intermediate part 66 has a first sealing bead 111 which at a first radial spacing r1 runs about the shaft 76, having a first end face 111.1 which forms the first sealing face 111.2.

As opposed to the embodiments of the fuel injection valve shown in FIGS. 3 and 4 however, the second sealing face is not formed by a sealing bead but by a gradation 127 on the side of the head 80 that in the direction of the longitudinal axis L faces the intermediate part 66, said gradation 127 running about the shaft 76 at a second radial spacing r2. The intermediate part 66 on the side that faces the head 80 likewise has a gradation 125 which encircles the guiding recess 74, wherein the mutually offset edges 125.1 and 127.1 of the gradations 125 and 127 in the shut position of the intermediate valve member 78 shown radially delimit the second annular sealing face 122.

The gradation 127 of the head 80 is formed by an undercut which at the same time configures the annular gap space 118 into which the high-pressure fuel supply port 86 opens. The gradation 127 has a horizontal face which forms the second sealing face 112.2 and in the shut position of the intermediate valve member 78, while forming the second annular sealing face 122 inherently closed in the encircling direction, bears in a sealing manner on a face 781 of the intermediate part 66 that in the direction of the longitudinal axis L faces the head 80. The face 781 of the intermediate part 66 that in that in the direction of the longitudinal axis L faces the head 80, therefore forms the intermediate valve seat 82 on which, in the shut position of the intermediate valve member 78, the first sealing face 111.2 of the first sealing bead 111, while forming a first annular sealing face 121 inherently closed in the encircling direction, also bears in a sealing manner.

The gradation 125 of the intermediate part 66 is formed by an annular recess 126 which in the encircling direction has a rectangular cross-sectional profile. In further variants, the annular recess 126 in the encircling direction can have a chamfered cross-sectional profile or a curved cross-sectional profile. The annular recess 126 forms an inner annular chamber which in the shut position of the intermediate valve member 78 is delimited by the intermediate part 66, the shaft 76 and the head 80.

It can furthermore be seen in FIG. 5*a* that the outlet bore 102 runs in the intermediate part 66. The intermediate part 66 is received in a receptacle recess 151 in the manner of a blind bore of an intermediate body 15, the latter serving as an actuator receptacle body 20 of the actuator assembly 38. As opposed to the embodiments of FIGS. 3 and 4, a separate intermediate part and a separate intermediate element are therefore not provided, but these two components are integrally configured as a single-piece intermediate part 66. The outlet bore 102 has an inclined bore portion which connects a guiding recess 74 in the manner of a blind bore of the intermediate part 66 to the eccentrically disposed low-pressure outlet 42.

The shaft 76 as well as the head 80 are able to be received in the guiding recess 74 in the manner of a blind bore of the intermediate part 66. The guiding recess 74 in the region thereof that faces the control piston 68 is extended into a head space 128 in which the head 80 is able to be received. The end side 84 of the guide sleeve 641 that faces the intermediate part 66 and adjoins the latter serves as a detent shoulder for the head 80 in the open position of the intermediate valve member 78.

As in FIG. 3 or 4, a separate intermediate element and a separate intermediate part could however also be provided instead of the single-piece intermediate part 66. It is also conceivable for the intermediate part and the guide sleeve to be configured as a single piece. Furthermore, it is also conceivable for the intermediate element and the intermediate part, shown in FIG. 3 or, 4, to be configured integrally as a single-piece component.

The shaft 76 has two annular protrusions 761 and 762 which are mutually spaced apart in the longitudinal direction L of the shaft 76 and encircle the shaft 76 (in part highlighted as dashed lines in FIG. 5*a*), by way of which the shaft 76 is guided in the guiding recess 74. Two throttle pathways which are disposed in series along the longitudinal axis L and encircle the shaft 76 in the longitudinal direction L are configured by the annular protrusions 761 and 762. As a result, the formation of turbulences and a turbulent flow of the fluid flowing through the intermediate space between the shaft 76 and the guiding recess 74 is promoted. A clearance of at least 50 μm is present in the radial direction between the shaft 76 and the guiding recess 74. In further embodiments, the clearance can in each case have a value between 70 μm and 100 μm. By virtue of the radial clearance, the radial extent of the second annular sealing face 122 can vary depending on the current radial position of the shaft 76 in the guiding recess 74. In order for the sealing function of the intermediate valve to be guaranteed, the maximum radial extent of the second annular sealing face 122 here is larger than the clearance.

In the embodiment shown in FIG. 5*a*, the clearance between the shaft 76 and the guiding recess 74 serves as the passage of the second connection, which between the high-pressure fuel supply port 86 and the valve chamber 44 is released by the intermediate valve member 78 in the open position. In the shut position of the intermediate valve member 78, the second annular sealing face 122 interrupts the second connection between the high-pressure fuel supply port 86 and the valve chamber 44.

FIG. 5*b* shows a fragment of a horizontal cross-sectional illustration of a further embodiment of a fuel injection valve according to the invention, wherein this embodiment of the fuel injection valve is embodied so as to correspond to the embodiment shown in FIG. 5*a*. For this reason, the line A-A along which the cross section shown in FIG. 5*b* was taken is shown in FIG. 5*a*. Therefore, FIG. 5*b* shows an embodiment of the embodiment of a fuel injection valve shown in FIG. 5*a*. As can be seen in FIG. 5*b*, the second annular protrusion 762 in the encircling direction has three chamfers 762.1, 762.2 and 762.3 by which an intermediate space 119 (or three mutually corresponding intermediate spaces, respectively), is/are formed between the shaft 76, or the annular protrusion 762, respectively, and the guiding recess 74. While not visible in FIG. 5*b*, the first annular protrusion 761 in the encircling direction also has corresponding chamfers. As a result of the chamfers 762.1-3 of the second annular protrusion 762 (and of the chamfers of the first annular protrusion), a pathway, formed by the intermediate space 119 between the chamfers and the guiding recess 74, is provided, said pathway serving as a passage of the second connection. Furthermore, by virtue of the chamfers 762.1-3 (and of the chamfers of the first annular protrusion) and of the pathway of the second connection provided as a result, the clearance between the shaft 76 and the guiding recess 74 can be kept smaller than in the embodiment described in the context of FIG. 5*a*, this leading to improved centering of the shaft. The three chamfers 762.1-3 (and the chamfers of the first annular protrusion) are mutually disposed at an angle of 120°. However, other arrangements are also conceivable; embodiments having in each case one chamfer per annular protrusion or two chamfers per annular protrusion, or a larger number of chamfers, are in particular conceivable.

Furthermore, the shaft without annular protrusions, i.e. in specific embodiments of the embodiments of the fuel injection valve shown in FIG. 3 or 4, for example, in the circumferential direction can also have at least one chamfer, or two or three chamfers, such that a pathway for the second connection is again formed by the intermediate space between the chamfer or the chamfers and the guiding recess.

FIG. 6 shows a fragment of a fourth embodiment of a fuel injection valve 10 according to the invention in a longitudinal section. The fragment represents a region of the fuel injection valve 10 that corresponds to the rectangle denoted with III in FIG. 2, wherein the specific design embodiment of this region of the fourth embodiment of the fuel injection valve 10 according to the invention differs from the fuel injection valve 10' according to WO 2016/041739 A1, shown in FIG. 2, in particular in terms of the hydraulic control device 72.

The intermediate valve member 78 has a valve chamber passage 441 which is connected to the valve chamber 44 and comprises a bore 441.1, parallel to the longitudinal axis L, and a horizontal bore 441.2. The valve chamber passage 441 connects a blind bore 92 of the intermediate valve member 78, connected to the valve chamber 44, to an annular gap space 118 which in the shut position of the intermediate valve member 78 shown is configured between the intermediate part 66 and the head 80 and is radially delimited by the first and the second annular sealing face 121, 122. The bore 441.1, which is parallel to the longitudinal axis L, by way of a first end opens into the annular gap space 118 and by way of a second end opens into the horizontal bore 441.2. The horizontal bore 441.2 in turn, by way of a first end, opens into the blind bore 92. As can be seen in FIG. 5*a*, a second end of the horizontal bore 441.2 is closed by a stopper 441.3. In one variant, the intermediate valve member 78, or the head 80, respectively, has a further valve chamber passage 441 which is shown in dashed lines in FIG. 5*a*. The horizontal bore 441.2, shown in dashed lines, of the further valve chamber passage 441 is not separately closed by a stopper because the horizontal bore 441.2, shown in dashed lines, can be bored conjointly with the horizontal bore 441.2, the latter shown on the left with solid lines.

The intermediate valve member 78 in the open position, by way of the bore 441.1, releases a second connection between the high-pressure fuel supply port 86 and the blind bore 92, or the valve chamber 44, respectively, so that the blind bore 92, or the valve chamber 44, respectively, can be flooded with fuel. In the shut position of the intermediate valve member 78, the second annular sealing face 122 interrupts the second connection between the high-pressure fuel supply port 86 and the valve chamber 44.

As opposed to the embodiments shown in FIGS. 3 to 5, the high-pressure fuel supply port 86 according to the embodiment shown in FIG. 6 opens into an annular chamber 120 which in the shut position of the intermediate valve member 78 is delimited by the intermediate part 66, the shaft 76 and the head 80. In the shut position of the intermediate valve member 78, the annular r chamber 120 adjoins the second annular sealing face 122 and is radially disposed so as to be closer to the shaft 76 than the second annular sealing face 122.

The annular chamber 120 has an internal annular chamber 108 which runs about the shaft 76, in the radial direction is delimited by the shaft 76 and the intermediate part 66 and is recessed on the shaft 76 per se. The high-pressure fuel supply port 86 opens into the internal annular chamber 108.

The annular chamber 120 furthermore has an annular gap space 117 which adjoins the internal annular chamber 108 and in the shut position of the intermediate valve member 78 is formed by an encircling gap between the intermediate part 66 and the head 80 and is radially adjacent to the second annular sealing face 122. The internal annular chamber 108 is formed by an encircling annular groove which in the radial direction is open toward the outside and has a trapezoidal cross section, wherein the obliquely running side faces away from the head 80.

The shaft 76 is guided in a tight sliding fit of approx. 3 μm to 10 μm in the guiding recess 74. The diameter of the vertical bore 441.1 of the valve chamber passage 441 is larger than the diameter of the throttle passage 90 and enables the blind bore 92 and the valve chamber 44 to be rapidly flooded when the intermediate valve member 78 moves away from the shut position.

In one variant, a secondary passage 97 is configured on the intermediate part 66, as is shown in dashed lines in FIG. 6. The secondary passage 97 connects the high-pressure chamber 26 to the valve chamber 44 and facilitates the opening procedure of the intermediate valve member 78 when the tappet 40 closes the low-pressure outlet 42 and separates the valve chamber 44 from the low-pressure fuel return 46.

FIG. 7 shows a fragment of a fifth embodiment of a fuel injection valve 10 according to the invention in a longitudinal section. The fragment represents a region of the fuel injection valve 10 that corresponds to the rectangle denoted with III in FIG. 2, wherein the specific design embodiment of this region of the fifth embodiment of the fuel injection valve 10 according to the invention differs from the fuel injection valve 10' according to WO 2016/041739 A1, shown in FIG. 2, in particular in terms of the hydraulic control device 72.

As opposed to the fourth embodiment shown in FIG. 6, the valve chamber passage 441 has a bore 441.1 which is inclined in relation to the longitudinal axis L. Thanks to the inclined bore 441.1 it is possible for the first sealing bead 111 to be disposed radially farther away from the shaft 76 in comparison to the fourth embodiment according to FIG. 6, without the stopper 441.3 having to be reduced in size. The valve chamber passage 441 by way of the inclined bore 441.1 opens into the annular gap space 118 which is s delimited by the head 80, the intermediate part 66 and the first as well as the second annular sealing face 121, 122. As in the fourth embodiment shown in FIG. 6, the horizontal bore 441.2 by way of one end opens into the blind bore 92.

In comparison to the fourth embodiment shown in FIG. 6, the internal annular chamber 108 of the annular chamber 120 is furthermore delimited by a recess on the shaft 76 as well as by a recess on the intermediate part 66. An annular gap space 117 again adjoins the internal annular chamber 108, said annular gap space 117 in the shut position of the intermediate valve member 78 being formed by an encircling gap between the intermediate part 66 and the head 80 and being radially adjacent to the second annular sealing face 122.

An optional secondary passage 97 which is configured by a rectilinear, horizontal bore on the shaft 76 and via the annular chamber 120 connects the high-pressure chamber 26, or the high-pressure fuel supply port 86, respectively, to the blind bore 92, is shown in dashed lines.

In comparison to the fourth embodiment shown in FIG. 6, the first and the second sealing bead 111, 112 are configured so as to be longer in the longitudinal direction L so that the annular gap space 118 has a larger depth in the longitudinal direction L.

Furthermore, the intermediate part 66 is configured as a single-piece component in which the outlet bore 102 comprising an inclined bore runs in a manner similar to that of FIG. **5*a*. However, a separate intermediate element and a separate intermediate part, as in FIG. 6, could be provided instead of the single-piece intermediate part 66. However, it is also conceivable for the intermediate element and the intermediate part in FIG. 6** to be configured as an integral component in a single piece.

In a manner similar to that shown in FIG. 6, a further valve chamber passage can be provided, this being shown in dashed lines in the right-hand region of the head 80.

The shaft 76 is guided in a tight sliding fit of approx. 3 μm to 10 μm in the guiding recess 74. The diameter of the inclined bore 441.1 of the valve chamber passage 441 is larger than the diameter of the throttle passage 90 and enables the blind bore 92 and the valve chamber 44 to be rapidly flooded when the intermediate valve member 78 moves away from the shut position.

The intermediate valve member 78 in the open position, by way of the bore 441.1, releases a second connection between the high-pressure fuel supply port 86 and the blind bore 92, or the valve chamber 44, respectively, so that the blind bore 92, or the valve chamber 44, respectively, can be flooded with fuel. In the shut position of the intermediate valve member 78, the second annular sealing face 122 interrupts the second connection between the high-pressure fuel supply port 86 and the valve chamber 44.

Proceeding from the shut position of the intermediate valve 83 shown in the figures, for injecting the tappet 40 by means of the solenoid of the actuator assembly 38 is lifted from the intermediate element 98 or the intermediate part 66, as a result of which the low-pressure outlet 42 is released. This has the consequence that a larger quantity of fuel per unit of time flows out of the valve chamber 44 into the low-pressure fuel return 46 than can be replenished by a flow from the throttle passage 90 and the potentially present secondary passage 97 into the valve chamber 44. As a result, the pressure in the valve chamber 44 drops, this having the consequence that the intermediate valve member 78 by way of the resulting compressive force is pressed against the intermediate part 66 so as to hold the intermediate valve 83 securely closed, on the one hand, and the pressure in the control chamber 70 drops, on the other hand. This in turn has the consequence that, as a result of the effect of the dual-action control piston 68 counter to the force of the compression spring 62', the injection valve member 56 is lifted from the injection valve seat 18', as a result of which an injection of fuel into the combustion chamber of the internal combustion engine is started.

If this injection is to be terminated, the tappet 40 is brought to bear on the intermediate element 98 or the intermediate part 66, as a result of which the low-pressure outlet 42 is closed. By means of the fuel flowing in through the throttle passage 90 and the potentially present secondary passage 97, the pressure in the valve chamber 44 increases, this causing a movement of the intermediate valve member 78 away from the intermediate valve seat 82. This movement is further facilitated as soon as the intermediate valve member 78 has carried out a minimum opening movement, because the annular cross section open as a result rapidly becomes substantially larger than the cross section of the supply port 96 and the inner annular chamber 117 in the embodiment shown in FIG. 3, for example, is flooded. In embodiments in which the high-pressure fuel supply port 86 opens into the annular gap space 118, the high system pressure in the annular gap space 118 facilitates the opening movement of the intermediate valve member 78. If there is an increased clearance between the shaft 76 and the guiding recess 74, fuel flows into the valve chamber 44 during the opening movement of the intermediate valve member 78, this fuel being able to rapidly flood said valve chamber 44 as soon as the sealing action by the annular sealing faces 121, 122 is cancelled.

In embodiments in which the valve chamber passage 441 opens into the annular gap space 118, the valve chamber 44 can be rapidly flooded by fuel which flows into the valve chamber passage 441 when the head 80 is lifted from the shut position of the intermediate valve 78, so that the opening movement of the intermediate valve member 78 is facilitated.

As a result of the head 80 of the intermediate valve member 78 being lifted from the intermediate part 66, a large flow cross section from the high-pressure fuel supply port 86 into the control chamber 70 is likewise rapidly released, this leading to a rapid termination of the injection procedure in that the injection valve member 56 is rapidly moved toward the injection valve seat 18 and comes to bear on the latter.

The invention claimed is:

1. A fuel injection valve for intermittently injecting fuel into the combustion chamber of an internal combustion engine, having a housing which defines a longitudinal axis and has a high-pressure fuel inlet and an injection valve seat;

a high-pressure chamber which is disposed in the housing and runs from the high-pressure fuel inlet to the injection valve seat;

an injection valve member which is disposed in the housing so as to be adjustable in the direction of the longitudinal axis and interacts with the injection valve seat;

a compression spring which impinges the injection valve member with a closing force directed in the direction towards the injection valve seat;

a guide part in which a control piston of the injection valve member is guided in a sliding fit;

an intermediate part which, together with the guide part and the control piston, delimits a control chamber;

a hydraulic control device for controlling the axial movement of the injection valve member by modifying the pressure in the control chamber, having an intermediate valve comprising an intermediate valve member which is configured in the shape of a mushroom and has a shaft guided in a guiding recess of the intermediate part, and a head, and an intermediate valve seat which is configured on a side of the intermediate part that faces the head and which interacts with the head, wherein the intermediate valve member in an open position releases a first connection between a high-pressure fuel supply port, connected to the high-pressure chamber, and the control chamber, and in a shut position interrupts the first connection between the high-pressure fuel supply port and the control chamber as well as, with the exception of a throttle passage, separates the control chamber from a valve chamber;

an electrically operatable actuator assembly for connecting the valve chamber to and separating the valve chamber from a low-pressure fuel return;

wherein the intermediate valve member in the open position releases a second connection between the high-pressure fuel supply port and the valve chamber, and in the shut position interrupts the second connection between the high-pressure fuel supply port and the valve chamber; and wherein the head in the shut position of the intermediate valve member, by way of a side that faces the intermediate part, across a first sealing face that runs at a first radial spacing about the shaft or the guiding recess, while forming a first annular sealing face inherently closed in the encircling direction, and across a second sealing face that runs at a second radial spacing about the shaft or the guiding recess, while forming a second annular sealing face inherently closed in the encircling direction, bears on the intermediate valve seat, wherein the first radial spacing is larger than the second radial spacing.

2. The fuel injection valve as claimed in claim 1, wherein the second connection runs between the high-pressure fuel supply port and a bore which is part of the valve chamber and runs through the shaft of the intermediate valve member.

3. The fuel injection valve as claimed in claim 1, wherein a first annular sealing bead, having a first end face which forms the first sealing face, is configured on that side of the head that faces the intermediate part or on that side of the intermediate part that faces the head.

4. The fuel injection valve as claimed in claim 1, wherein a second annular sealing bead, having a second end face which forms the second sealing face, is configured on that side of the head that faces the intermediate part or on that side of the intermediate part that faces the head.

5. The fuel injection valve as claimed in claim 1, wherein the intermediate part on the side that faces the head has at least one gradation, and the head on the side that faces the intermediate part has at least one gradation, wherein in the shut position of the intermediate valve member mutually offset edges of the gradations of the intermediate part and of the head radially delimit in each case the first and/or the second annular sealing face.

6. The fuel injection valve as claimed in claim 5, wherein a gradation of the intermediate part forms an inner annular chamber which in the shut position of the intermediate valve member is delimited by the intermediate part, the shaft and the head.

7. The fuel injection valve as claimed in claim 1, wherein the high-pressure fuel supply port in the intermediate part runs in such a manner that the high-pressure fuel supply port in the shut position of the intermediate valve member opens into an annular gap space which in the shut position of the intermediate valve member is configured between the intermediate part and the head and is radially delimited by the first and the second annular sealing face.

8. The fuel injection valve as claimed in claim 7, wherein the supply port by way of the second end opens toward the external side of the intermediate valve member in such a manner that the second end in the shut position of the intermediate valve member is disposed at a radially smaller spacing from the shaft than the second annular sealing face.

9. The fuel injection valve as claimed in claim 1, wherein the second connection comprises a supply port of the intermediate valve member which by way of a first end opens into the valve chamber and by way of a second end opens toward an external side of the intermediate valve member.

10. The fuel injection valve as claimed in claim 1, wherein the second connection comprises a passage which is formed by a clearance present in the radial direction between the shaft and the guiding recess, said clearance being at least 10 μm.

11. The fuel injection valve as claimed in claim 10, wherein said clearance is between 20 μm and 50 μm.

12. The fuel injection valve as claimed in claim 1, wherein the shaft has two annular protrusions that are mutually spaced apart in the longitudinal direction of the shaft.

13. The fuel injection valve as claimed in claim 12, wherein the annular protrusions in the circumferential direction each have at least one chamfer, wherein the second connection comprises a passage which is formed by an intermediate space between the at least one chamfer and the guiding recess.

14. The fuel injection valve as claimed in claim 13, wherein the annular protrusions in the circumferential direction each have two or three chamfers.

15. The fuel injection valve as claimed in claim 1, wherein the shaft in the circumferential direction has at least one chamfer, wherein the second connection comprises a passage which is formed by an intermediate space between the at least one chamfer and the guiding recess.

16. The fuel injection valve as claimed in claim 1, wherein the second connection comprises a bore which runs through the head of the intermediate valve member and forms a valve chamber passage connected to the valve chamber and by way of one end opens out on a side of the head that faces the intermediate part.

17. The fuel injection valve as claimed in claim 16, wherein the fuel injection valve has an annular chamber which in the shut position of the intermediate valve member is delimited by the intermediate part, the shaft and the head and into which the high-pressure fuel supply port opens.

18. The fuel injection valve as claimed in claim 1, wherein the valve chamber passage in the intermediate valve member runs in such a manner that the valve chamber passage in the shut position of the intermediate valve member opens into an annular gap space which in the shut position of the intermediate valve member is configured between the intermediate part and the head and is radially delimited by the first and the second annular sealing face.

19. The fuel injection valve as claimed in claim 1, wherein the shaft is permanently guided in the guiding recess of the intermediate part.

20. A fuel injection valve for intermittently injecting fuel into a combustion chamber of an internal combustion engine, having a housing which defines a longitudinal axis and has a high-pressure fuel inlet and an injection valve seat,

- a high-pressure chamber which is disposed in the housing and runs from the high-pressure fuel inlet to the injection valve seat,
- an injection valve member which is disposed in the housing so as to be adjustable in the direction of the longitudinal axis and interacts with the injection valve seat,
- a compression spring which impinges the injection valve member with a closing force directed in the direction towards the injection valve seat,
- a guide part in which a control piston of the injection valve member is guided in a sliding fit,
- an intermediate part which, conjointly with the guide part and the control piston, delimits a control chamber,
- a hydraulic control device for controlling the axial movement of the injection valve member by modifying the pressure in the control chamber, having an intermediate valve comprising an intermediate valve member which is configured in the shape of a mushroom and has a shaft, guided in a guiding recess of the intermediate part, and a head, and an intermediate valve seat which is configured on one side of the intermediate part that faces the head and which interacts with the head, wherein the intermediate valve member in an open position releases a connection between a high-pressure fuel supply port connected to the high-pressure chamber and the control chamber, and in a shut position interrupts the connection between the high-pressure fuel supply port and the control chamber as well as, with the exception of a throttle passage, separates the control chamber from a valve chamber,
- an electrically operatable actuator assembly for connecting the valve chamber to and separating the valve chamber from a low-pressure fuel return, wherein the head in the shut position of the intermediate valve member, by way of a side that faces the intermediate part, across a first sealing face that runs at a first radial spacing about the shaft or the guiding recess, while forming a first annular sealing face closed in the encircling direction, and across a second sealing face that runs at a second radial spacing about the shaft or the guiding recess, while forming a second annular sealing face closed in the encircling direction, bears on the intermediate valve seat, wherein the first radial spacing is larger than the second radial spacing.

21. The fuel injection valve as claimed in claim 20, wherein the high-pressure fuel supply port in the intermediate part runs in such a manner that the high-pressure fuel supply port in the shut position of the intermediate valve member opens into an annular gap space which in the shut position of the intermediate valve member is configured between the intermediate part and the head and is radially delimited by the first and the second annular sealing face.

22. The fuel injection valve as claimed in claim 21, wherein the shaft is guided in a sliding fit in the guiding recess of the intermediate part, wherein a clearance of at least 10 μm, is present in the radial direction between the shaft and the guiding recess.

23. The fuel injection valve as claimed in claim 22, wherein the clearance is between 20 μm and 50 μm.

24. The fuel injection valve as claimed in claim 20, wherein the intermediate valve member has a supply port which by way of a first end opens into the valve chamber and by way of a second end opens toward an external side of the intermediate valve member in such a manner that the second end in the shut position of the intermediate valve member is disposed at a radially smaller spacing from the shaft than the second annular sealing face.

25. The fuel injection valve as claimed in claim 21, wherein the shaft has at least one encircling annular protrusion, the shaft being guided in the guiding recess by way of said at least one encircling annular protrusion.

26. The fuel injection valve as claimed in claim 25, wherein the shaft has two annular protrusions that are mutually spaced apart in the longitudinal direction of the shaft.

27. The fuel injection valve as claimed in claim 26, wherein the shaft is guided in the guiding recess of the intermediate part in such a manner that a clearance of at least 50 μm, is present in the radial direction between the shaft and the guiding recess.

28. The fuel injection valve as claimed in claim 27, wherein the clearance is between 70 μm and 100 μm.

29. The fuel injection valve as claimed in claim 20, wherein the intermediate valve member has a valve chamber passage which is connected to the valve chamber and in the intermediate valve member runs in such a manner that the valve chamber passage in the shut position of the intermediate valve member opens into an annular gap space which in the shut position of the intermediate valve member is configured between the intermediate part and the head and is radially delimited by the first and the second annular sealing face.

30. The fuel injection valve as claimed in claim 29, wherein the fuel injection valve has an annular chamber which in the shut position of the intermediate valve member is delimited by the intermediate part, the shaft and the head and into which the high-pressure fuel supply port opens.

31. The fuel injection valve as claimed in claim 29, wherein the valve chamber passage in the head has a bore which is parallel to the longitudinal axis or inclined in relation to the longitudinal axis and in the shut position of the intermediate valve member opens into the annular gap space.

32. The fuel injection valve as claimed in claim 20, wherein a first annular sealing bead, having a first end face which forms the first sealing face, is configured on that side of the head that faces the intermediate part or on that side of the intermediate part that faces the head.

33. The fuel injection valve as claimed in claim 20, wherein a second annular sealing bead, having a second end face which forms the second sealing face, is configured on that side of the head that faces the intermediate part or on that side of the intermediate part that faces the head.

34. The fuel injection valve as claimed in claim 20, wherein the intermediate part on the side that faces the head has at least one gradation, and the head on the side that faces the intermediate part has at least one gradation, wherein in the shut position of the intermediate valve member mutually offset edges of the gradations of the intermediate part and of the head radially delimit in each case the first and/or the second annular sealing face.

35. The fuel injection valve as claimed in claim 34, wherein a gradation of the intermediate part forms an inner annular chamber which in the shut position of the intermediate valve member is delimited by the intermediate part, the shaft and the head.

* * * * *